United States Patent
Milne

[15] 3,657,862
[45] Apr. 25, 1972

[54] APPARATUS FOR CAPPING CONTAINERS

[72] Inventor: John S. Milne, 2682 Spyglass Drive, Shell Beach, Calif. 93449

[22] Filed: June 4, 1970

[21] Appl. No.: 43,401

[52] U.S. Cl............................................53/297, 53/329
[51] Int. Cl..............................................B65b 7/28
[58] Field of Search.......................53/42, 296, 297, 329

[56] References Cited

UNITED STATES PATENTS 3,507,093    4/1970    Marion.............................53/296 X
3,017,729    1/1962    Cheeley............................53/27

Primary Examiner—Travis S. McGehee
Attorney—Johnson, Dienner, Emrich, Verbeck & Wagner

[57] ABSTRACT

An apparatus for applying a liquid-tight cover to various sizes and types of containers by automatically feeding a strip of biaxially oriented plastic film to a point directly below a sealing head unit, cutting a length of plastic film, raising the container to catch the plastic film strip and bring it into engagement with the sealing head unit, applying heat to the sealing head unit to heat shrink the film strip about the mouth of the container, and after a predetermined heating period lowering the container to an unload position.

34 Claims, 19 Drawing Figures

PATENTED APR 25 1972 3,657,862

Inventor
John Milne
By Johnson Dienner Emrich
Herbeck & Wagner
Att'ys

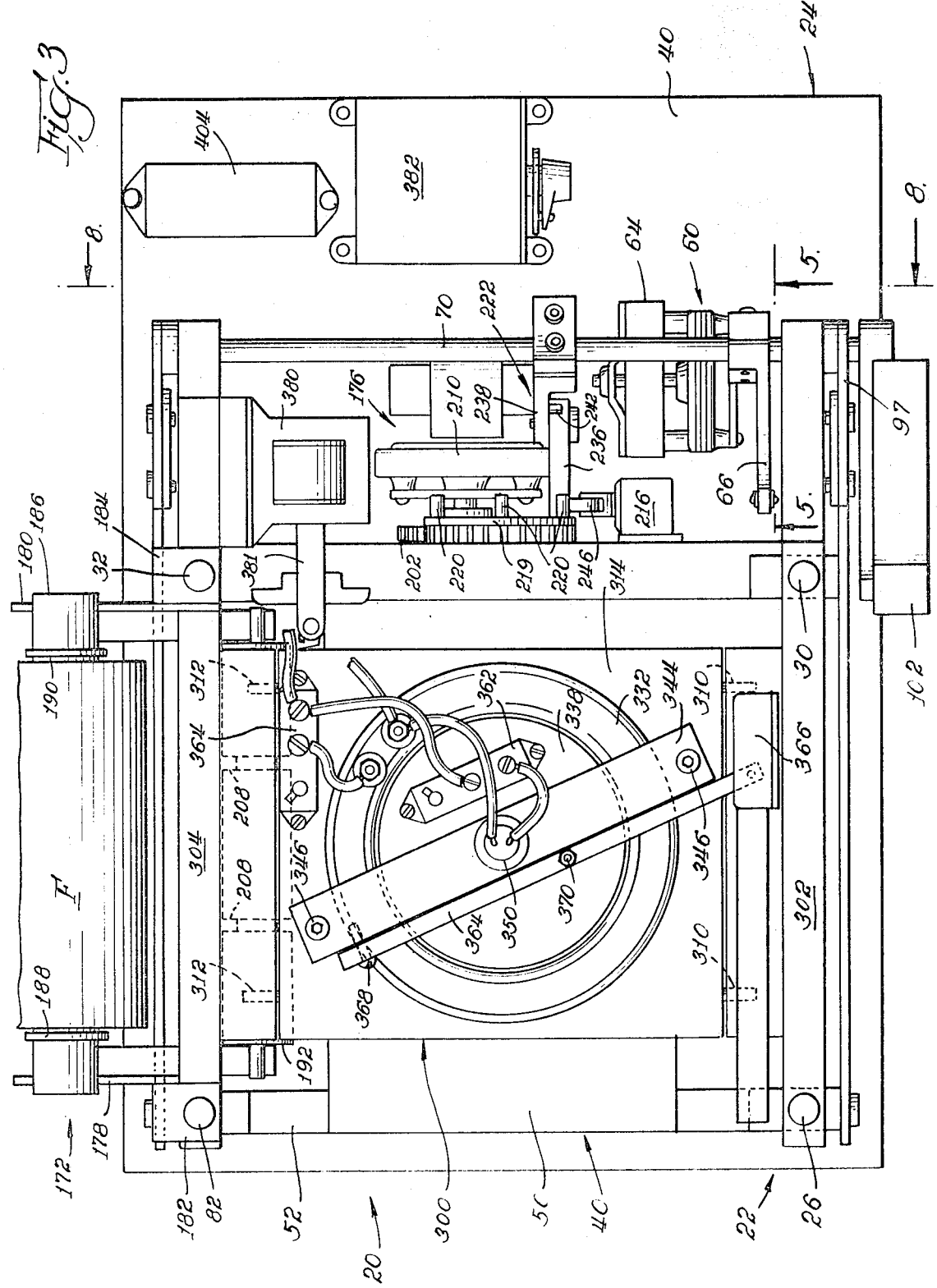

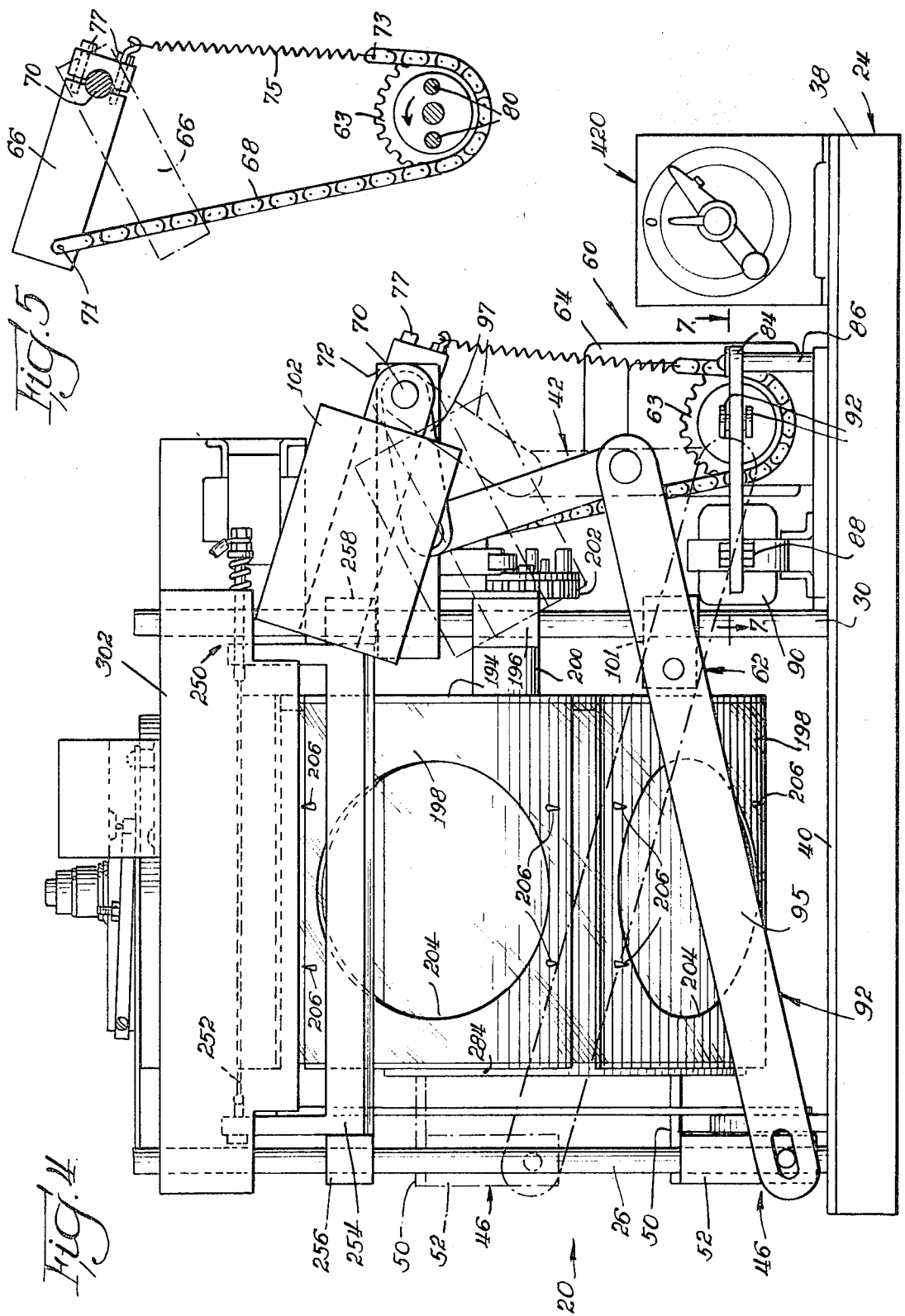

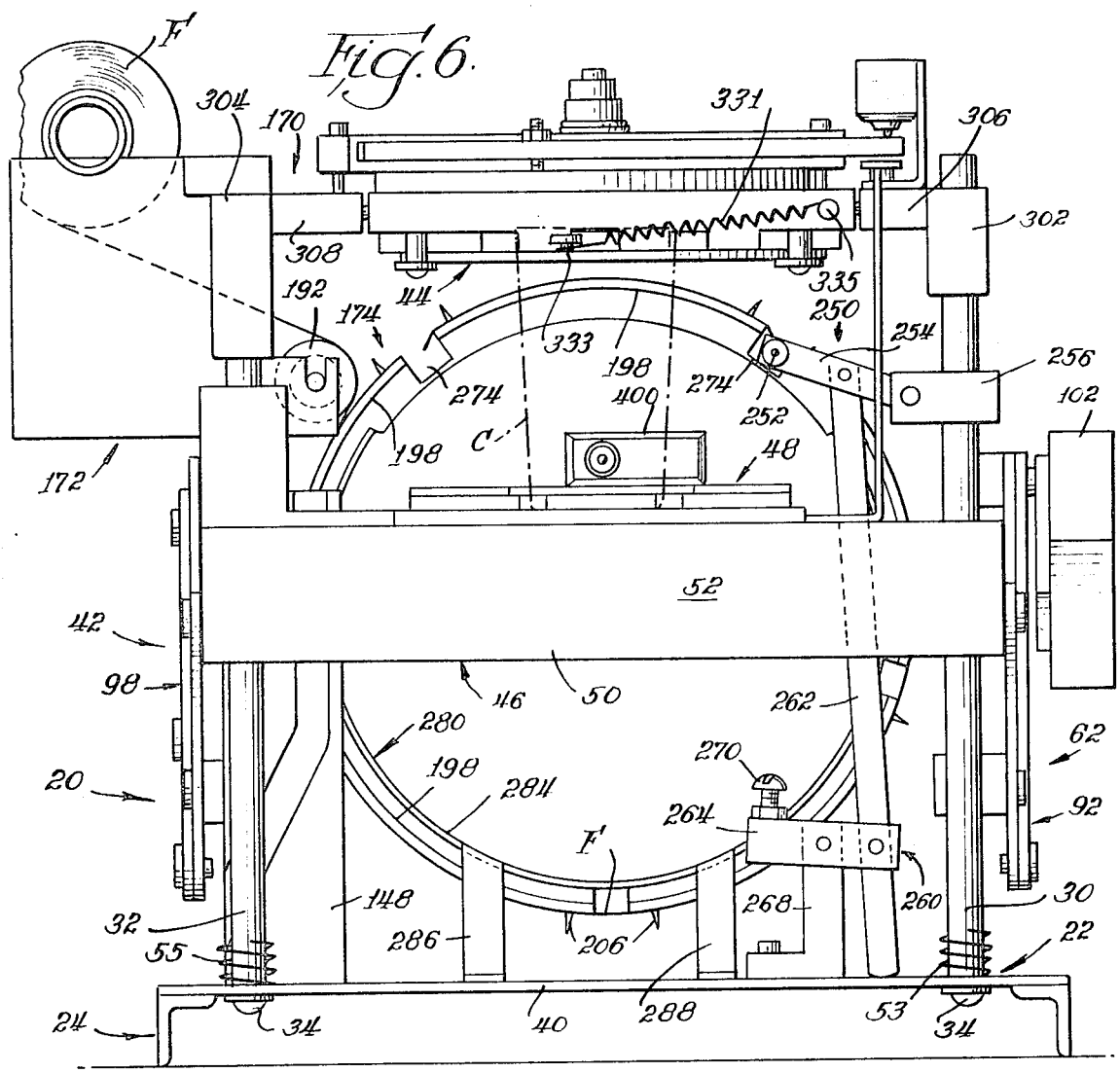
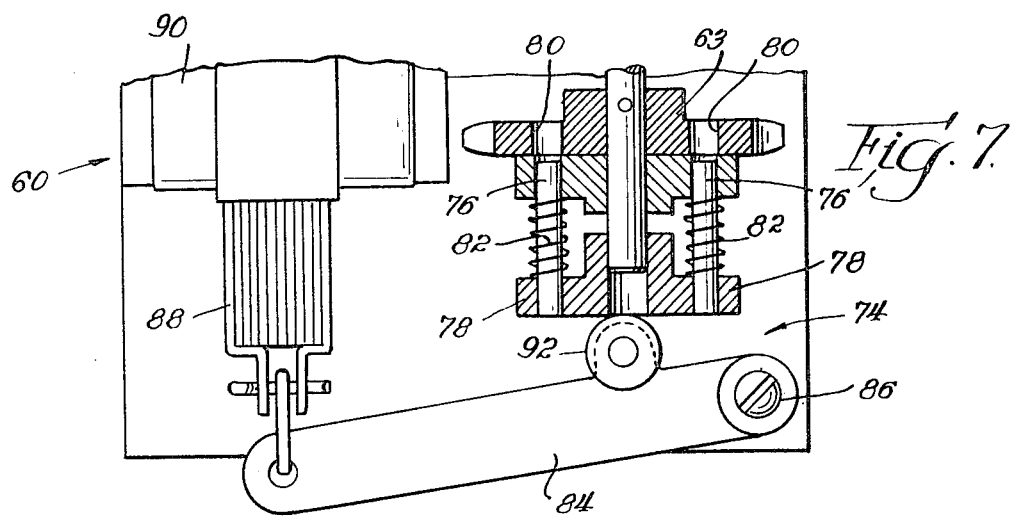

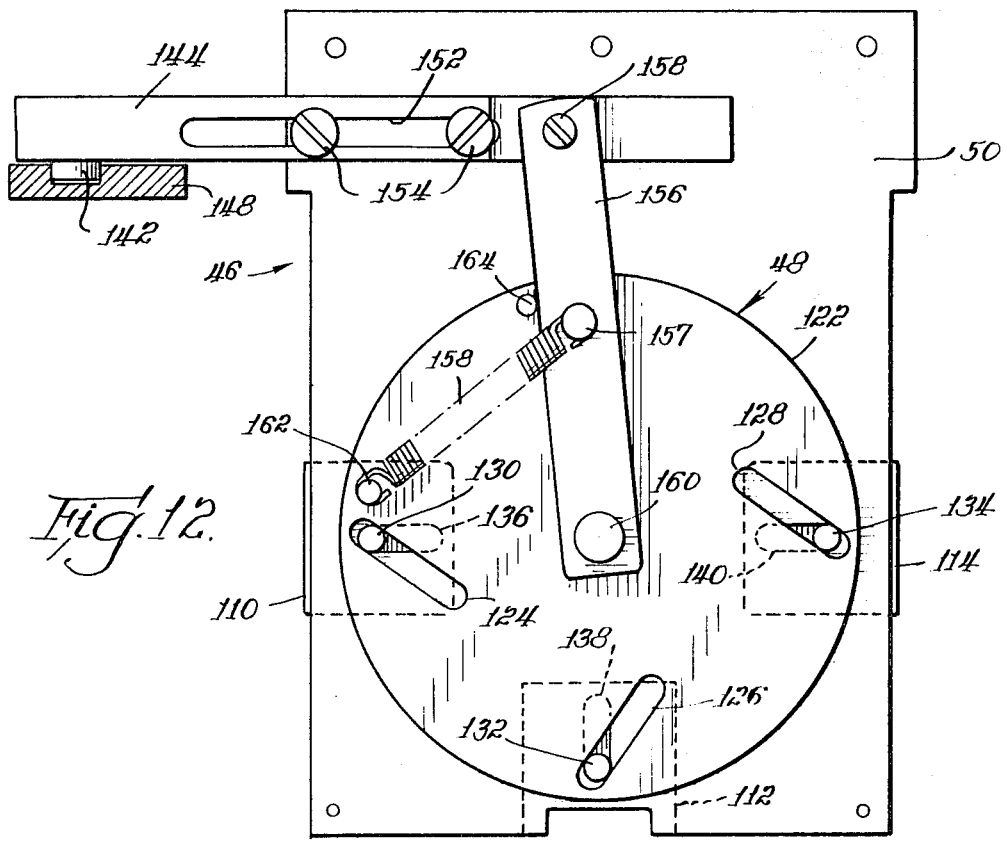
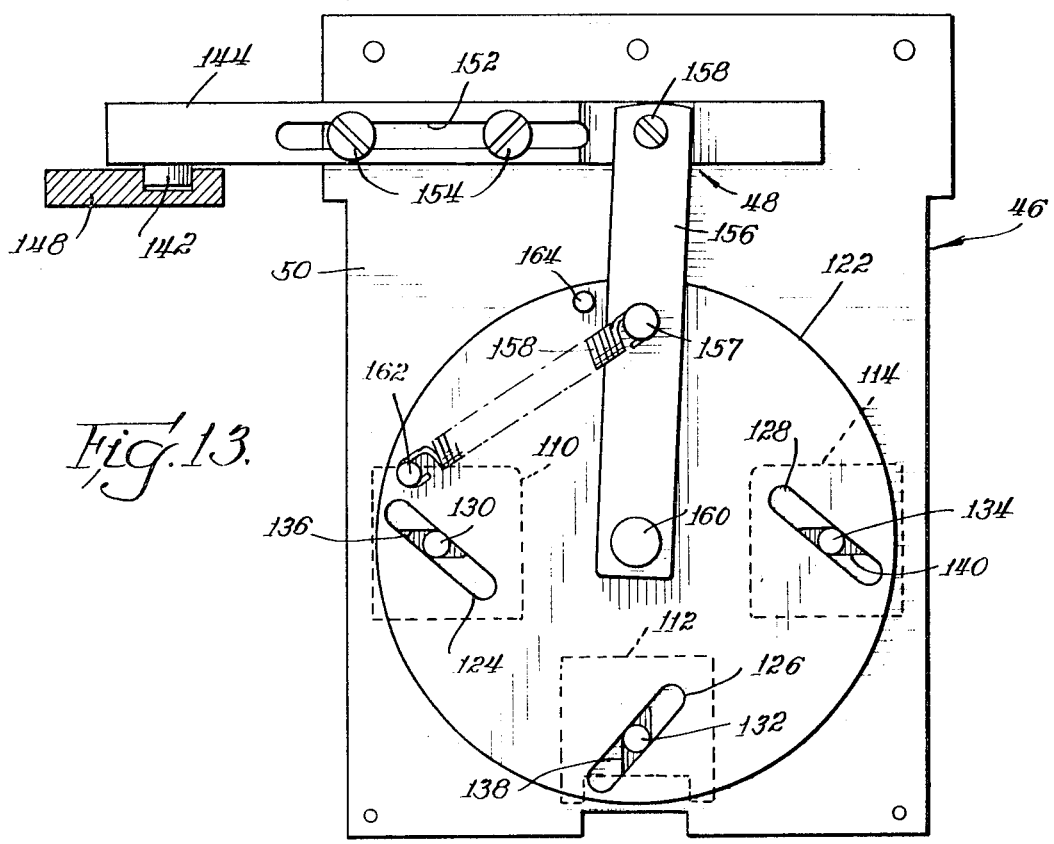

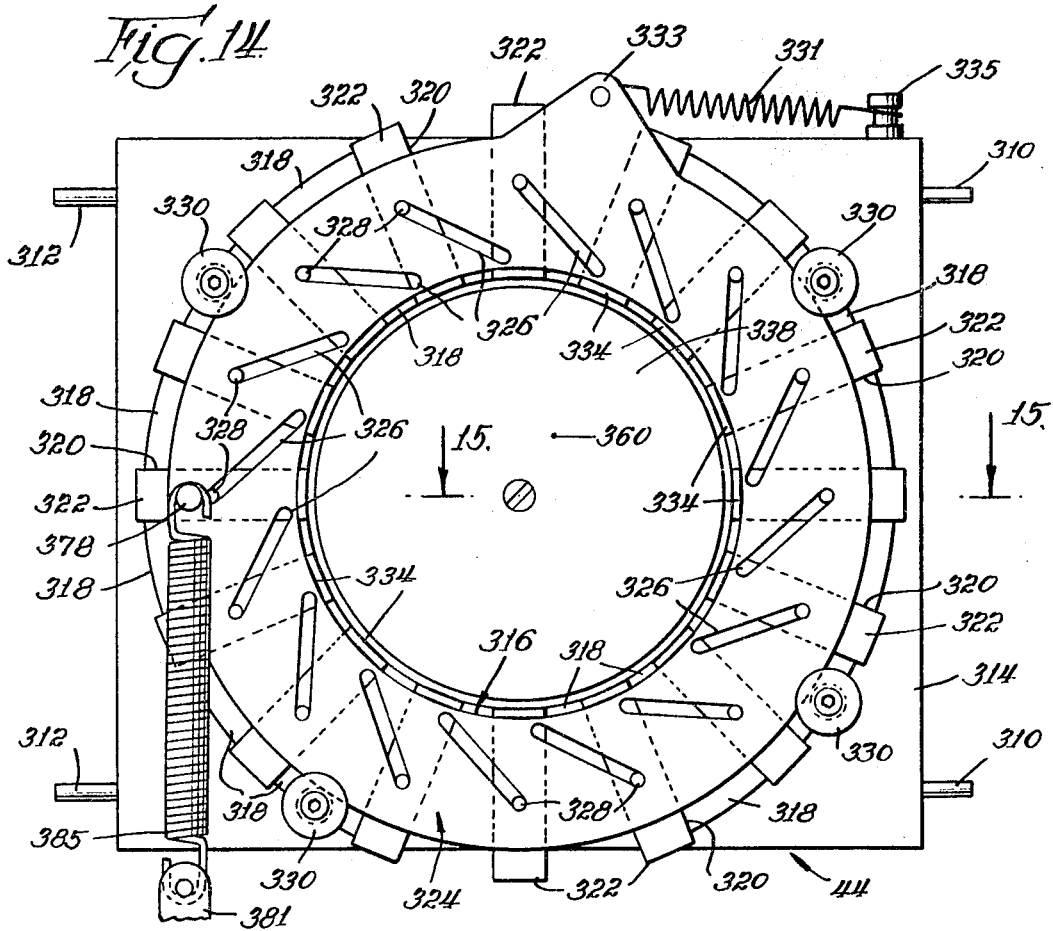
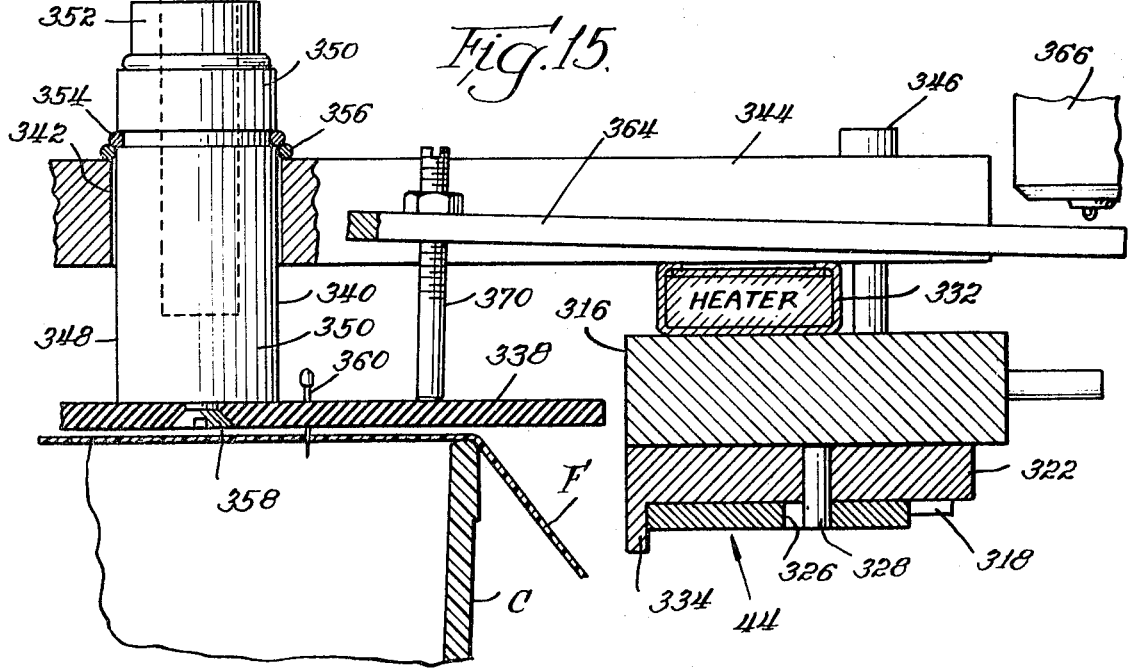

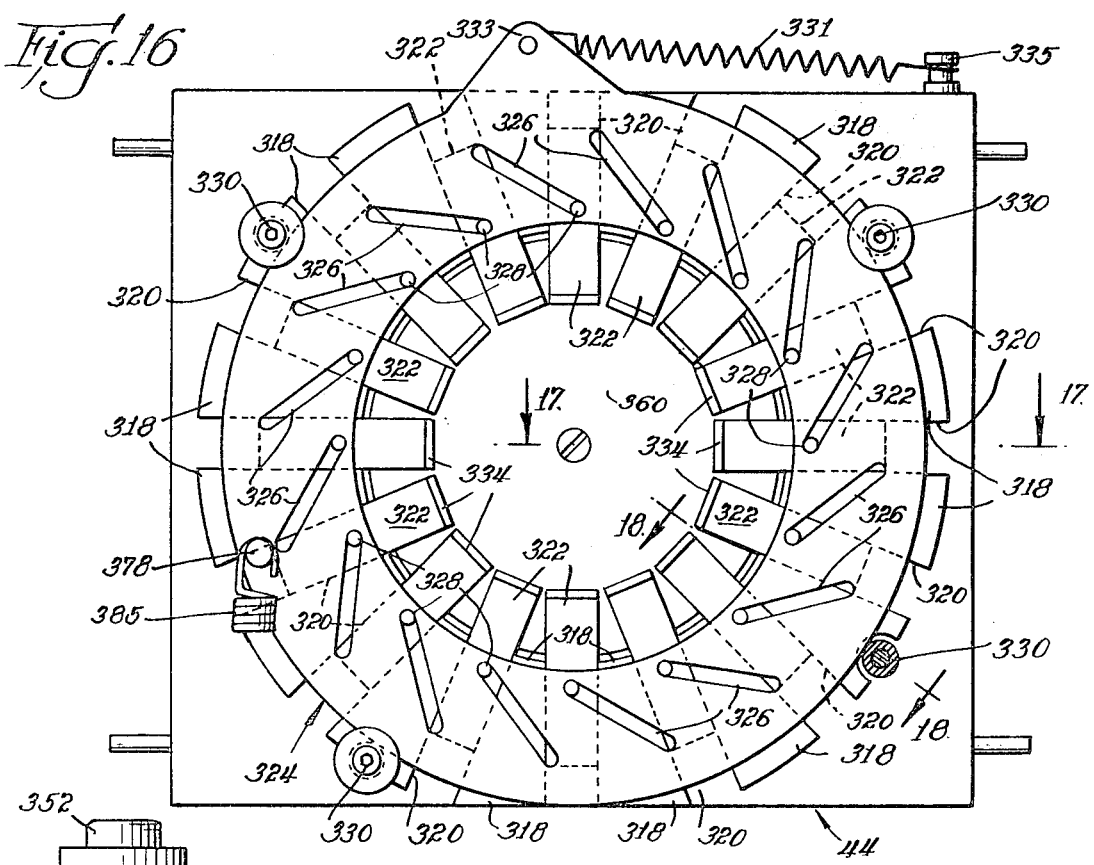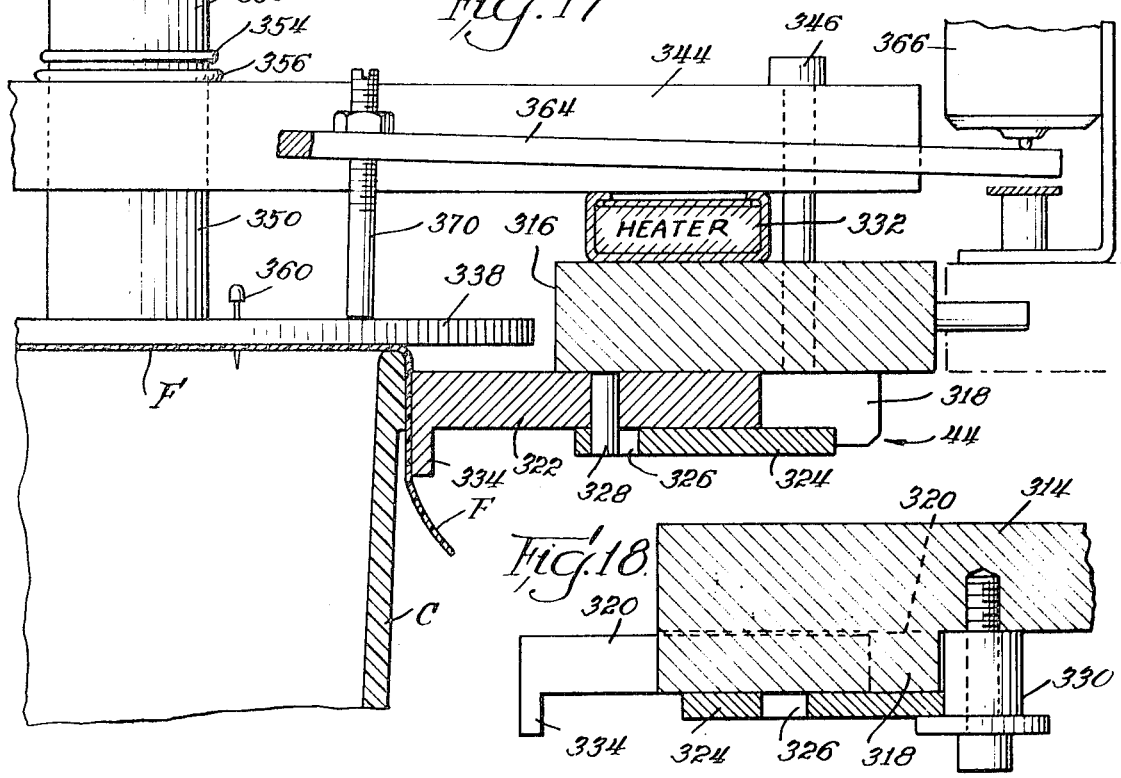

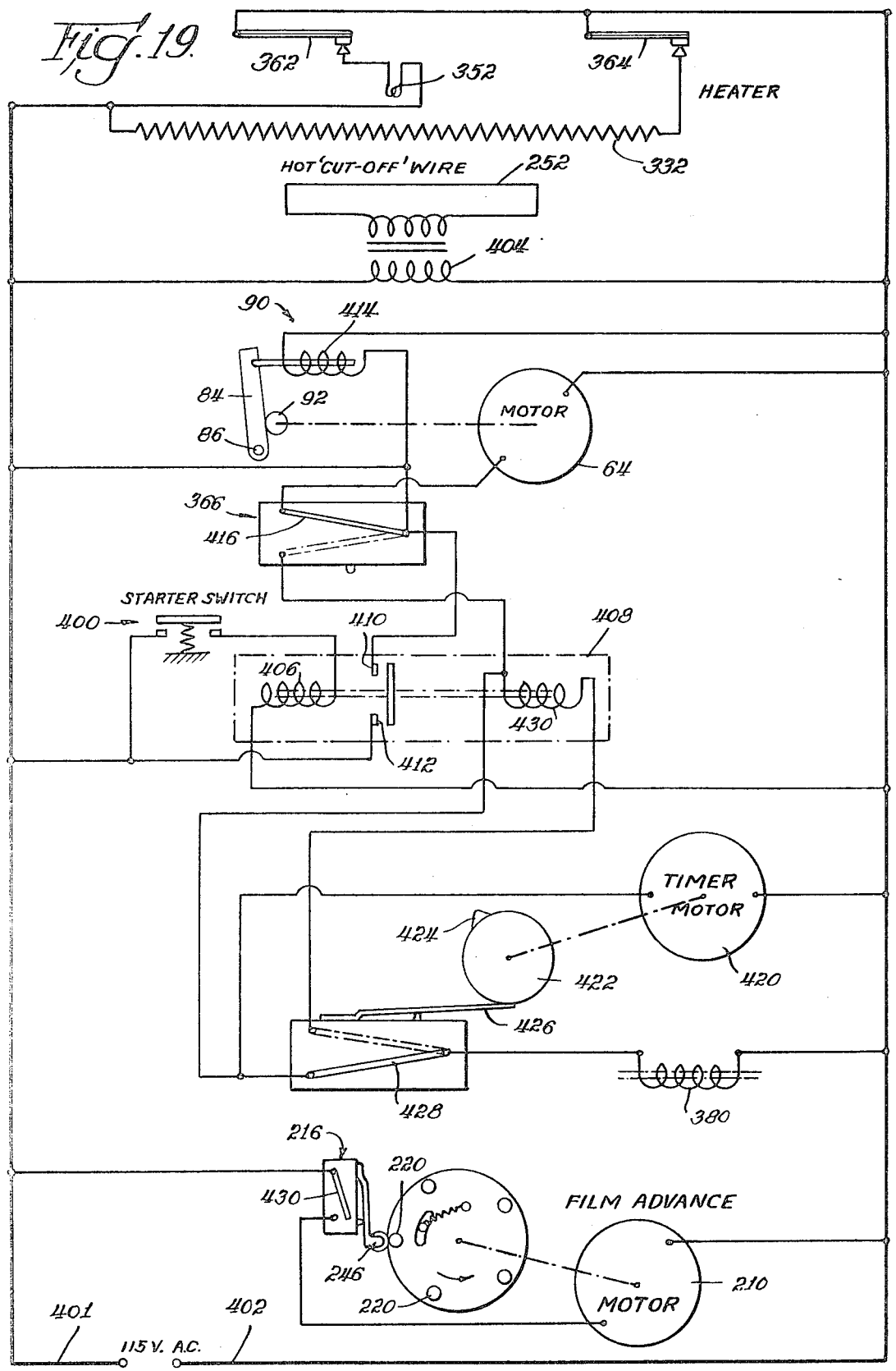

APPARATUS FOR CAPPING CONTAINERS

BACKGROUND OF THE INVENTION

This invention relates to a device for applying a liquid-tight cover to a container using a heat-shrinkable plastic film material.

The discovery a few years ago of the biaxially oriented plastic film made possibly a new method for temporarily sealing a container which is both quicker to use and less expensive than the conventional plastic-disc lids. It is known that by applying heat directly to a strip of biaxially oriented plastic film draped across the mouth of a container, the plastic film strip shrinks in two biaxial directions to form a liquid-tight seal about the mouth of the container. There are several commercially available cup capping apparatus which use this sealing technique to simultaneously apply covers for several rows of filled containers. These devices which are manually operated, are not very practical where it is desired to cover a single container at infrequent intervals since they are not constructed to accommodate only one container. Even if they were modified to provide a cover for a single container, they would still be unsatisfactory since their manual operation requires too much time and attention.

This invention is directed to satisfying the need for a quick and inexpensive method of covering a single container at infrequent intervals by providing a completely automatic machine for capping the containers using biaxially oriented strips of film.

SUMMARY OF THE INVENTION

This invention is constructed on a portable frame structure consisting of several assemblies which cooperate to automatically apply a sufficient cover to various sizes and types of container. The preferred embodiment is designed to accommodate cup-shaped containers, but the principles of this invention apply as well to other regular-shaped containers. strip plates, The principle of this invention is to place a container in a capping machine that automatically performs a sequence of operations. The machine is constructed on a portable frame structure which supports a heat sealing assembly in an elevated position. The heat sealing assembly includes a sealing head unit which is thermally insulated from the rest of the capping machine. The sealing head unit consist of a heated disc and a plurality of heated fingers which are mounted below the disc a short distance in a circular arrangement. The heated fingers are moved radially inwardly by a cam disc device to engage a container slightly below its upper open end and shrink a square section of heat shrinkable plastic film draped over the upper open end to form a liquid-tight seal.

To prepare the capping machine for the next succeeding automatic cycle, the last operation of each cycle is to feed the end of a roll of heat shrinkable plastic film to a point directly below and across the sealing head unit.

The automatic cycle is started by placing a liquid container on an elevator platform and pushing it rearward into a centering device where its sidewall trips a starting switch to energize an elevator assembly. The energization of the elevator assembly raises the elevator platform upwardly towards the sealing head unit and as the platform rises the centering device displaces the container until it is centered with respect to the sealing head unit. As the elevator platform is raised, the elevator assembly trips a film strip cutting assembly to lower a heated resistance wire into contact with the plastic film such that a selected length of the heat shrinkable film disposed below the sealing head unit is cut.

As the elevator platform continues to rise, the upper edge of the container catches the cut length of film and carries it upwardly a short distance into engagement with the sealing head unit. Contact with the sealing head unit actuates an electrical switch to stop the elevator assembly. Simultaneously, the plurality of heated fingers are moved radially inwardly to engage the container around and slightly below its lip portion to form a heat shrinkable seal.

After a predetermined heat sealing period, the heated fingers are moved radially outwardly away from the container and the elevator platform lowers to the starting position. Upon the return of the elevator platform to the starting position, an actuating arm on the elevator assembly causes the energization of the film advance assembly to feed the end of a roll of heat shrinkable film across and directly below the sealing head unit. Upon completion of the feeding of the film strip, the container capping machine of this invention has completed its complete automatic cycle and the machine is prepared for another container to be covered in the same manner.

BRIEF DESCRIPTION OF DRAWINGS

For a better understanding of this invention, reference is made to the accompanying drawings in which:

FIG. 3 is a top plan view of the preferred embodiment of this invention;

FIG. 4 is a side elevational view taken from the right side of the preferred embodiment of FIG. 1;

FIG. 5 depicts the chain drive unit for raising the elevator platform of the preferred embodiment of this invention and can be seen in FIG. 4;

FIG. 6 is a front elevational view of the preferred embodiment of this invention with the elevator assembly in its raised position and a cup-shaped container illustrated in dotted lines having a heat shrinkable film applied to its upper open end;

FIG. 7 is a cross-sectional view taken along the line 7—7 of FIG. 4 and looking in the direction of the arrows;

FIGS. 12 and 13 illustrate the underside of the centering device of FIG. 11 showing, respectively, the position of parts as the elevator platform moves from the starting position to the elevated cup capping position;

FIG. 14 illustrates the sealing head unit horizontally mounted at the top of the preferred embodiment illustrated in FIG. 1;

FIG. 15 is a cross-sectional view taken along the line 15—15 of FIG. 14 and looking in the direction of the arrows;

FIG. 16 is an illustration of the opposite side of the sealing head unit shown in FIG. 14;

FIG. 17 is a cross-sectional view taken along the line 17—17 of FIG. 16 and looking in the direction of the arrows;

FIG. 18 is a cross-sectional view taken along the line 18—18 of FIG. 16 and looking in the direction of the arrows;

FIG. 19 is an electrical schematic circuit diagram illustrating the electrical components which permit the preferred embodiment of this invention to automatically apply a heat shrinkable strip of film across the mouth of a liquid container.

DESCRIPTION OF PREFERRED EMBODIMENT

Figure 1:
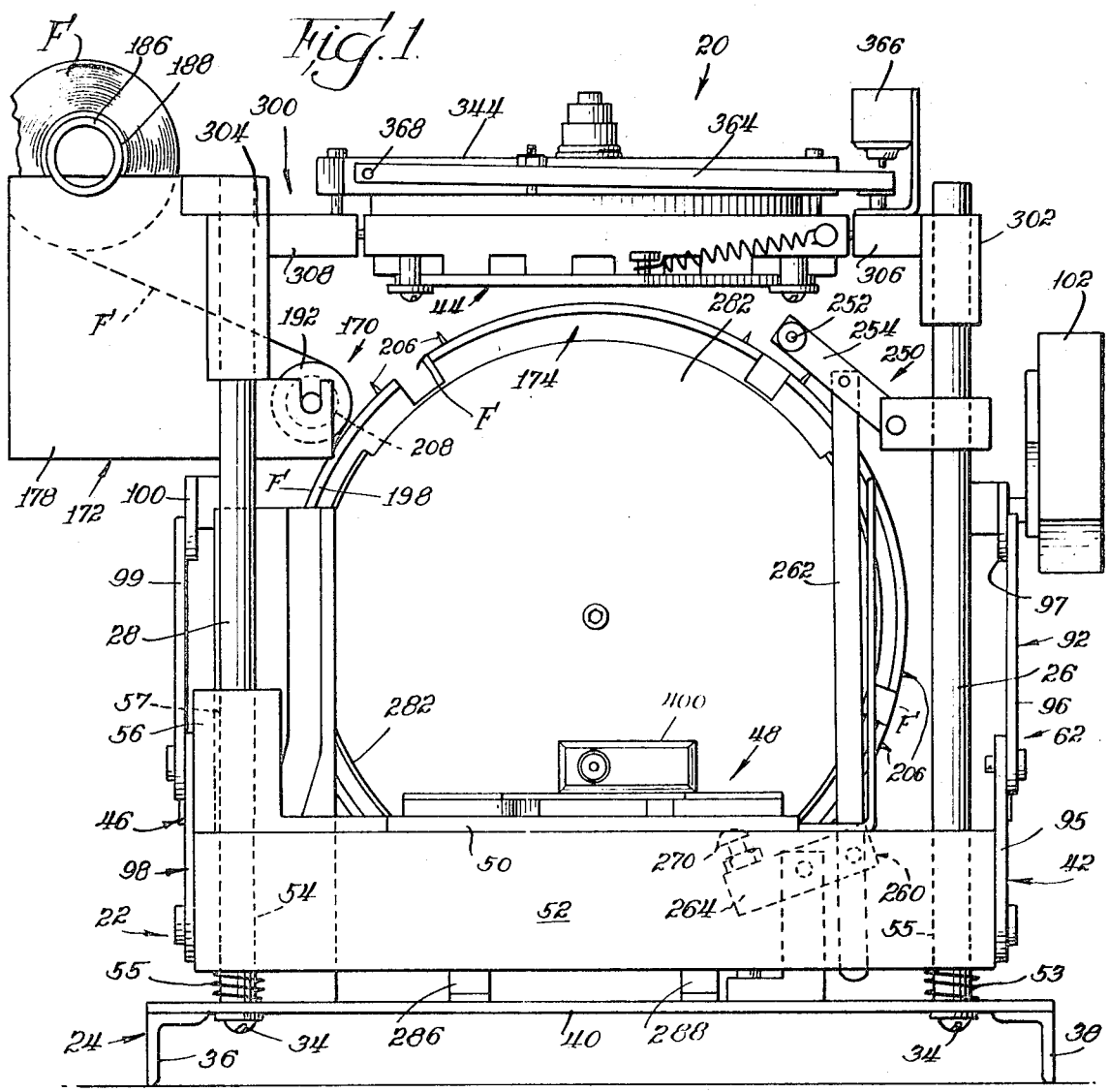
FIG. 1 is a front elevational view of the preferred embodiment of this invention.

Referring to FIG. 1 there is illustrated a liquid container capping machine which embodies the principles of this invention and is generally designated by the reference numeral 20. The container capping machine 20 is particularly designed for applying a cover to a cup-shape container, but as will become apparent with the following description, the machine 20 could be readily modified to apply covers to other regular-shaped liquid containers.

Throughout the description of the preferred embodiment, the capping machine 20 is described as applying a cover to a liquid container. This is strictly for convenience in disclosing the invention. The capping machine can as well cover a container for solids, such as food solids.

The container capping machine 20 is designed to be portable with all parts and components mounted on frame structure 22. Frame structure 22 consists of a base member 24 on which is mounted four vertical mounting rods or posts 26, 28, 30 and 32 (FIG. 3) in a rectangular pattern. The mounting rods or posts 26, 28, 30 and 32 are fastened on the base structure 24 by means of screws 34 (FIGS. 1 and 6) threaded through openings in the base structure 24 and fastened through threaded bores formed axially in the lower end of the mounting posts. The base structure 24 consists of two parallel extending L-shaped bars 36, 38 secured to the opposite longitudinal edges of rectangular horizontal base plate 40.

The elevator assembly 42 performs a number of important functions in the automatic operation of the liquid container capping machine 20, including the raising of the container to the sealing head unit 44 and the centering of the container with respect to the sealing head unit 44. The elevator assembly 42 includes an elevator unit 46 and a cup centering device 48 carried by the elevator platform 50.

The horizontal elevator platform 50 of elevator unit 46 has its forward edge secured to a vertical frame member 52. The vertical frame member 52 is slidably mounted on mounting posts 26, 28 by a pair of cylindrical parallel bores 54, 55 having a cross section slightly larger than cylindrical rods 26, 28 to guide elevator unit 46 in up and down directions. On the left hand end of vertical frame member 52, as viewed in FIG. 1, an L-shaped guide member 48 having a cylindrical bore 49 is slidably mounted on mounting rod 28 for alignment purposes so that the elevator unit 46 will not twist and become jammed.

Referring to FIG. 4, the elevator unit 46 includes an elevator drive mechanism 60 which raises and lowers the elevator platform 50 and vertical frame member 52 through the cooperation of linkage device 62. The elevator drive mechanism 60 when energized rotates the chain drive sprocket 62 mounted on the output shaft of an electric motor 64 in a counterclockwise direction which exerts a downward pull on lever 66 (FIG. 5) through the movement of chain 68. The lever 66 which is fixedly mounted on an elongated cylindrical rod 70 by means of a pair of set screws 72 exerts a turning moment on the rotatably mounted cylindrical rod 70.

The length of chain 68 is wrapped about chain drive sprocket 63 and has one end 71 pivotally fastened to the free end of lever 66 which is pulled downwardly as chain drive sprocket 63 rotates counterclockwise. The other end of the chain 73 is interconnected to the fixed end of lever 66 by a spring 75. The spring 75 serves to hold the end 73 in a taut condition and compresses to raise end 73 in a vertical direction as the chain 68 is driven counterclockwise by the chain sprocket 63. Cylindrical rod 70 is rotatably mounted at its opposite ends in two circular bores formed in horizontal bars 72, 74 (FIG. 8) secured, respectively, to mounting rods 30, 32 and the counterclockwise turning of rod 70 through the interconnection with linkage device 62 causes the elevator platform 50 to rise. By virtue of the linkage device 62, a small amount of rotation of cylindrical rod 70 raises the elevator platform 50 a considerably distance, as is illustrated by the dotted lines in FIGS. 4 and 5. The electric motor 64 for the electric drive mechanism 60 is a conventional A-C motor with a speed reducing gear arrangement coupling its output shaft to the chain drive sprocket 62.

To hold the elevator platform 50 in the elevated position during the heat sealing operation, the electric drive mechanism 60 has a clutch device 74 (FIG. 7) which upon the deenergization of elevator motor 64 holds the chain drive sprocket 63 in a locked position, by means of two locking studs 76 which extend perpendicular from clutch disc 78 and seat in diagonally opposite apertures 80 formed in chain drive sprocket 63 (FIG. 5). A pair of springs 82 surrounding each of the locking studs constantly urge clutch disc 78 away from the chain drive sprocket 63. Referring to FIGS. 4 and 7, it can be seen that a clutch actuating lever 84 having one end pivotally mounted to a vertical post 86 and the other end coupled to the plunger 88 of clutch solenoid 90, carries a pair of rollers 92 which ride against the clutch disc 78. When the elevator drive motor 64 is energized to raise the elevator unit 46, the clutch solenoid 90 is also energized with the result that its core member or plunger 88 is withdrawn inwardly pulling the left end (as viewed in FIG. 7) of the clutch actuating lever 84 clockwise about post 86 and pushing clutch disc 78 inwardly against the spring bias of springs 82 such that upon the chain drive sprocket 63 rotating to a position where its apertures 80 are in alignment with the locking stud 76, the locking studs seat in these apertures 80.

Thus, the locking studs 82 are held into locking engagement with chain sprocket 63 to rotate clutch disc 78 during the rise of elevator unit 46. However, only a small braking force is applied by clutch device 74 since the pair of rollers 92 rotate with clutch disc 78.

When the container C is raised to the elevated heat sealing position (See FIG. 6), the elevator drive motor 210 is deenergized to stop the elevator platform 50, but the clutch solenoid 90 remains energized in order that the elevator platform will be fixed in the elevated heat sealing position during the heat sealing operation.

At the end of the heat sealing operation, the clutch solenoid 90 is deenergized, causing the plunger 88 to move outwardly and the locking studs 82 return to their normal unengaging position under the biasing action of springs 82 and thereby free the elevator unit 46 to lower to the starting position.

The linkage device 62 which interconnects the vertical frame member 52 to the electric elevator drive mechanism 60 consists of two identical linkage structures 92, 98 on opposite sides of the capping machine 20 that interconnects the opposite ends of cylindrical rod 70 to the opposite ends of vertical frame member 52. Since these linkage structures 92, 98 are identical, only one will be described in detail. Referring to FIG. 4, the linkage structure 92 consists of a relatively long linkage member 95 having one end pivotally connected to the vertical frame member 52 and an intermediate linkage 96 pivotally connected between the other end of linkage 95 and linkage 97 whose opposite end is fixedly mounted on one end of rod 70. About one-third of the distance from the pivotal connection with intermediate linkage 96, the linkage member 95 is pivotally supported on a block 101 on mounting rod 30. The dotted lines in FIG. 4 show the relative position of linkage members 95, 96, 97 as the elevator platform 50 is raised. Similarly, elongated linkage member 98 intermediate linkage member 99 and linkage member 100 are connected between the opposite ends of cylinder rod 70 and vertical frame member 52. Likewise, elongated linkage member 98 is pivotally supported on a block 103 (FIG. 8) on mounting rod 32.

A counter weight 102 is provided on the end of cylindrical rod 70 (FIG. 4) to prevent the vertical frame member 52 and associated elevator platform 50 from falling too quickly upon release of the clutch device 74. As shown in FIG. 4, the counterweight 102 moves to the lowered dotted position when the elevator platform is in the elevated position. To lower the elevator unit 46 the counterweight 102 must be raised to its solid line position, and consequently functions as counter balancing force to the weight of the vertical frame member 52 and elevator platform 50 to gently lower the elevator unit 46. Springs 53 and 55 disposed about the lower ends, respectively, of mounting rods 26 and 28 cushion the fall of elevator unit 46 to prevent the elevator platform 50 from being brought to an abrupt halt.

For proper sealing about the mouth of a container, it is important that the cup-shaped container C be centered relative to the sealing head unit 44 prior to the engagement of the lip of the cup with the sealing head unit 44. The cup-shaped container C is centered as the elevator platform 50 raises by means of a cup centering mechanism 112. The centering of the cup-shaped container C is accomplished by three jaw members 110, 112, and 114 which move together towards a centering point directly below the center of the sealing head unit 44 and engage the bottom sidewall of container C at three points located 90° from each other. The jaw members 110, 112 and 114 are slidably mounted at the rearward end of elevator platform 50, being sandwiched between the platform 50 and a U-shaped plate 116 secured to elevator platform 50. Two triangular shaped pieces 118, 120 mounted to the elevator platform 50 maintain the jaw members 110, 112 and 114 in their respective 90° relationship.

Referring to FIGS. 12 and 13, it can be seen that the three jaw members 110, 112 and 114 are simultaneously drawn towards the centering position by the clockwise movement of cam disc 122 which is rotatably mounted at its center by pin 160 to the underside of elevator platform 50. Cam disc 122 has three cam slots 124, 126 and 128 into which are received, respectively, follower studs 130, 132, and 134, which extend perpendicular from the middle of jaw members 110, 112 and 114, respectively, and which project through slots 136, 138, and 140 in elevator platform 50. By turning cam disc 122 counterclockwise, the follower studs 130, 132 and 134 are caused to ride inwardly in the respective cam slots 124, 126 and 128 with the result that the follower studs and associated centering jaw members are, simultaneously and respectively directed inwardly along slots 136, 138 and 140 of elevator platform 50.

As the elevator platform 50 is raised, the cam disc 122 is driven clockwise (FIGS. 12 and 13) through the lateral movement of cam follower 142 and cam follower arm 144. Cam follower arm 144 is slidably mounted to the underside of elevator platform 50 by means of its elongated slot 152 cooperating with a pair of pins 154 mounted to elevator platform 50.

Figure 10:
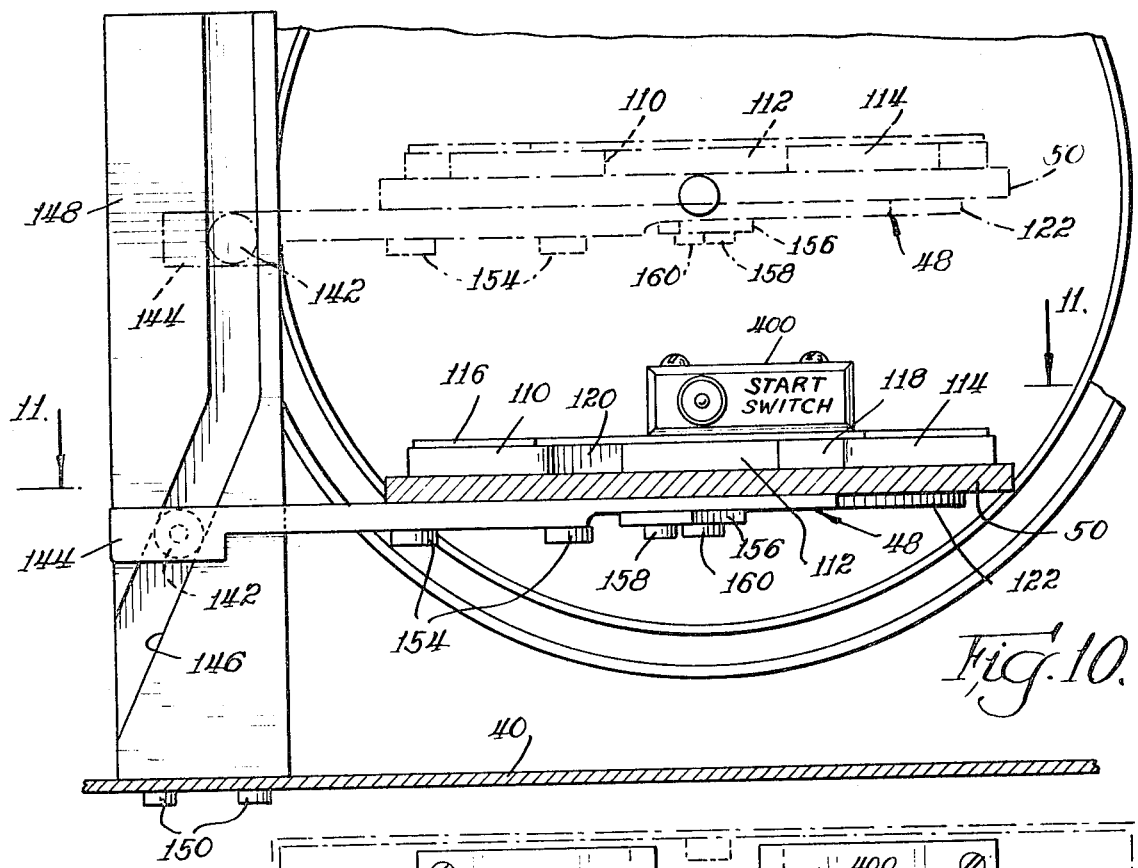
FIG. 10 illustrates the elevator platform and actuating means for operating the centering device.
Figure 11:
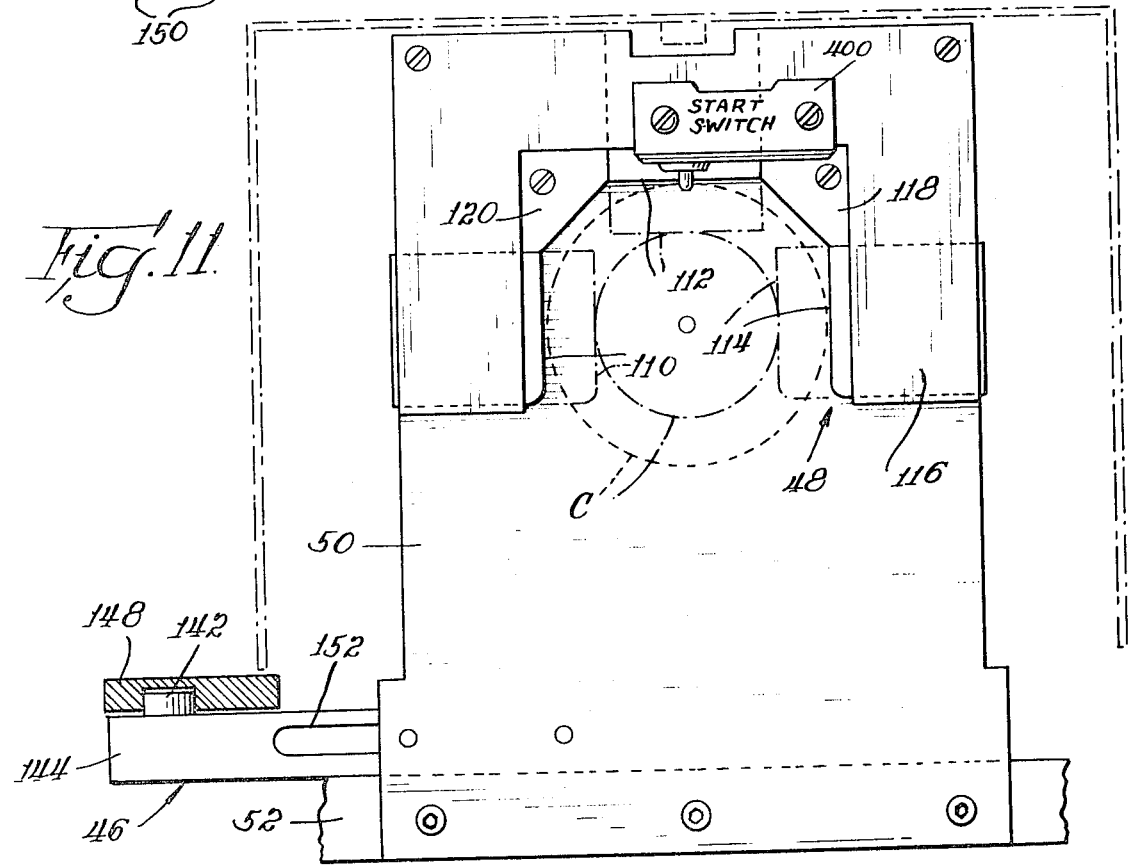
FIG. 11 is a cross-sectional view taken along the line 11—11 of FIG. 10 and looking in the direction of the arrows.

The cam follower 142 on the left end (as viewed in FIGS. 10-13) of cam follower arm 144 rides in a cam track 146 formed in vertical plate 148 (FIG. 10). Vertical plate 148 is mounted to base plate 40 by means of screws 150, or other suitable fastening means, and is located behind vertical post 30 (see FIG. 6).

The cam disc 122 is interconnected to the cam follower arm 144 by means of a linkage arm 156 and spring 158 (FIG. 12). Linkage arm 156 is pivotally connected at its opposite ends to the cam follower arm 144 at 158 and to the underside of elevator platform 50 at the center of cam disc 122, by pivot pin 160. The spring 158, which is interconnected between the mid section of linkage arm 156 by a screw 157 and a stud 162 on cam disc 122, permits the cup centering device 48 to accommodate various sizes of diameters at the lower end of container C by providing a lost-motion between the cam disc 122 and the linkage arm 156 after the centering jaws 110, 112 and 114 have stopped with the completion of centering the cup-shaped container C. Accordingly, after the jaw members are stopped, the spring 158 is stretched as the cam follower arm 144 is pushed to the right with the raising of the elevator platform 50. Such a stretch condition of the spring 158 is illustrated in FIG. 13 where the cam follower 142 is in the vertical portion of cam track 146.

Upon the lowering of the elevator platform 50, the cam follower arm 144 is caused to move to the left, as viewed in FIGS. 12 and 13, which rotates linkage arm 156 counterclockwise. Through the action of stop pin 164 on cam disc 122, the cam disc is also rotated counterclockwise to return the jaw members 110, 112 and 114 to their radially outward starting position and thereby free their grip on the bottom portion of the cup-shaped container C.

The last operation in the automatic cycle of the capping machine 20 is feeding the end of the heat shrinkable film roll to a point directly below and across the sealing head unit 44. This operation is performed by the film advance assembly 170 which consists of a film supply unit 172, a film advance drum unit 174 and a film advance drive unit 176.

The film supply unit (shown in FIGS. 1, 3 and 6) rotatably mounts a roll of heat shrinkable plastic film on two L-shaped support members 178, 180 which have blocks 182, 184, respectively, secured to their upper ends for supporting the supply unit 172 on the respective upper ends of vertical cylindrical rods 28, 32. A roll of heat shrinkable plastic film F is rotatably supported on a tubular member 186 which seats in two complementary semicircular recesses formed in the top edge of L-shaped members 178, 180. The axial movement of the film F on tubular member 186 is restrained by two clip-on rings 188, 190 (FIG. 3). A strip of film F extending from the roll is tangentially fed to the film advance drum unit 174 by means of a roller 192 rotatably mounted on the lower inner end of L-shaped supports 178, 180.

The film advance drum unit 174 is rotatably mounted on cross bar 196 at its mid-section. Cross bar 196 extends between vertical mounting rods 30, 32. The film advance unit 174 consist of circular plate 19 and a plurality of film feeding arcuate segments 198 extending forwardly from the outer edge of circular plate 194. The shaft 193 (FIG. 9) for the film advance drive unit 174 is secured perpendicularly to the center of circular plate 194 and extends through a bearing surface 195 (FIG. 9) formed through block 200 (FIG. 4) and cross bar 196. The end of shaft 193 is bonded to the center of spur gear 202.

To rigidly support the film feeding arcuate segments 198, a plurality of thickened curved plates 197 are formed in an equal space relationship about the periphery of circular plate 194. The curvature of these arcuate plates 197 being identical to the arcuate segments 198.

Each of the film feeding arcuate segments 198 has an opening 204 formed in its center portion to permit the upper end of the cup-shaped container C to pass therethrough and catch the strip of film held across opening 204 by spikes 206. By virtue of the spikes 206, a length of film is held across the opening 204. As the film advance drive unit 176 is rotated counterclockwise, as viewed in FIG. 1, each set of spikes 206 as it passes through the annular grooves 208 (FIG. 3) formed in roller 192, punches through the film F, and together the spikes 206 pull the film off the roll mounted on film supply unit 172 and around the film drum unit 174.

When the preceding cup-shaped container C has been capped and the elevator platform 50 is lowered to the starting position, the film advance drive unit 176 is energized and drives the film advance drum unit 174 counterclockwise through a predetermined angle such that the center opening 204 in the next succeeding film feeding arcuate segment 198 is moved directly below the sealing head unit 44. The film advance drive unit 176 (FIGS. 3 and 8) consists of an electric motor 210 mounted on the rear of base plate 40 and having a spur gear 212 secured to its output shaft which meshes with spur gear 202 secured to the shaft of film advance drum unit 174.

Figure 8:
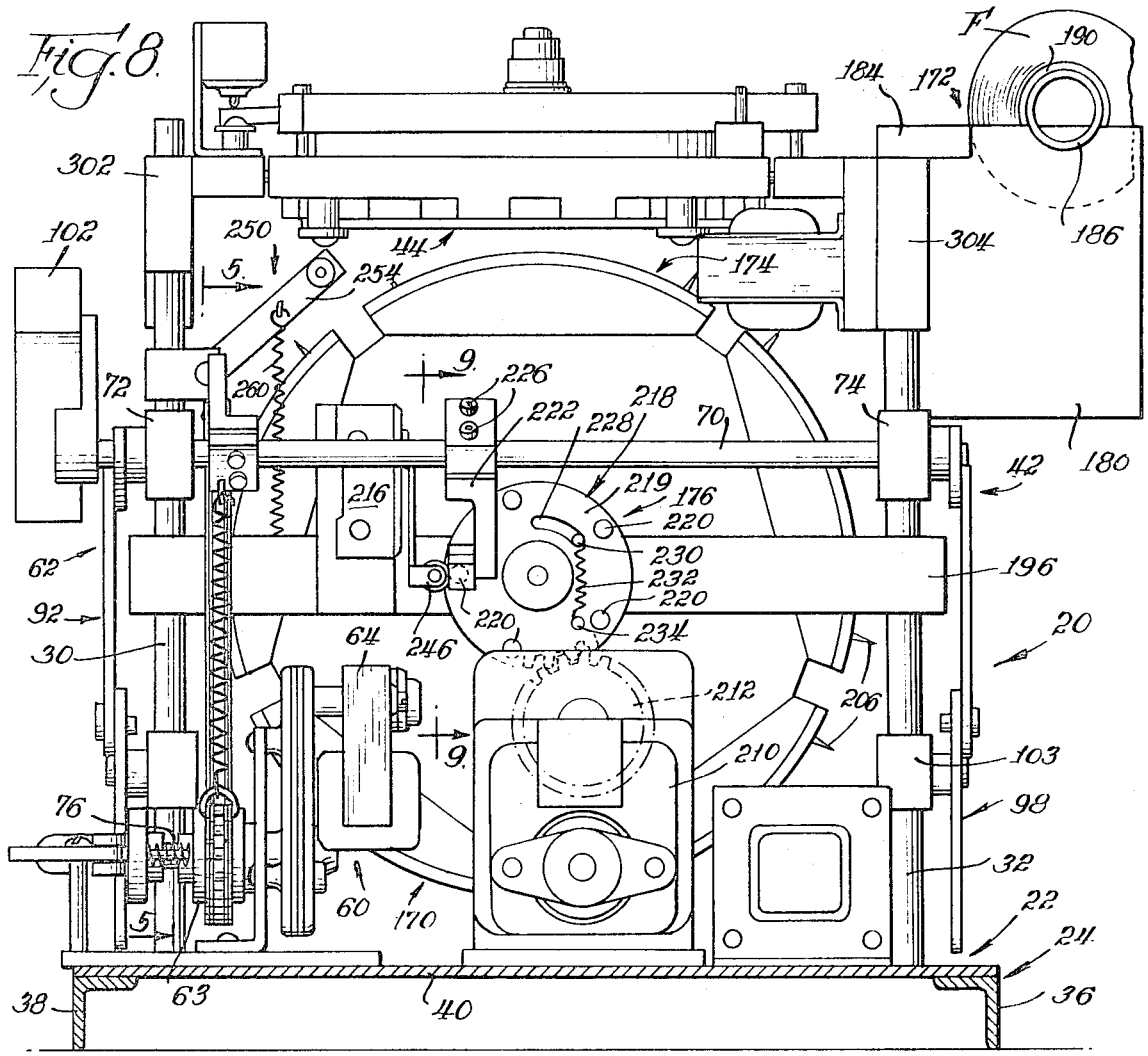
FIG. 8 is a back elevational view illustrating the rear side of the preferred embodiment of this invention.

The energization of electric motor 210 of film advance drive unit 176 occurs when microswitch 216 (FIGS. 8 and 9), which is mounted on cross bar 196 is actuated. The actuation of the microswitch 216 is controlled by a novel switch tripping device 218. The switch tripping device 218 consists of a disc 219 rotatably mounted on the back side of gear 202 with a plurality of switch engaging studs 220 extending perpendicular around its outer surface and a switch latching arm 222 (FIG. 9) fixedly mounted on the cylindrical rod 70 of the elevator assembly 42 by means of two set screws 226. Referring to FIG. 8, the rotatably mounted circular discs 219 has an arcuate slot 228 through which a stud 230 projects which is perpendicular to and mounted on the spur gear 202. A spring 232 is stretched between the stud 230 on gear 202 and a lug 234 on disc 219 so that disc 219 is urged to rotate counterclockwise until the left end of arcuate slot 228 is stopped by the stud 230.

Figure 9:
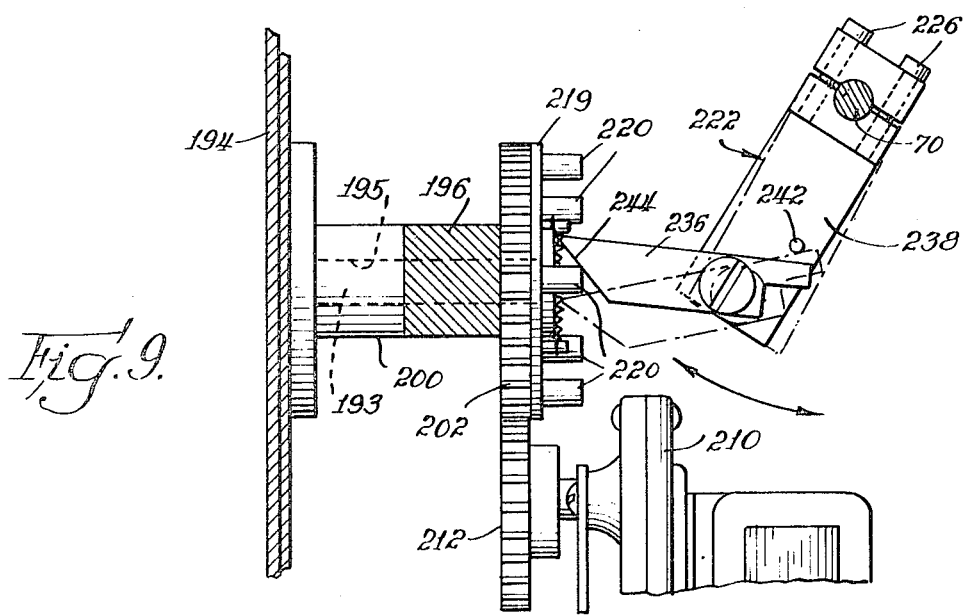
FIG. 9 is a cross-sectional view taken along the line 9—9 of FIG. 8 and looking in the direction of the arrows.

Referring to FIG. 9, the switch latch arm 222 has a latching finger 236 pivotally mounted to its body portion 238. The counterclockwise movement of the latching finger 236 is limited by a stop lug 242 extending from the central body portion 238.

The switch tripping device 218 operates as follows: The initial starting position of the parts of the tripping device 218 are illustrated in the solid lines of FIGS. 8 and 9. The raising of the elevator unit 46 by the elevator drive mechanism 60 rotates the cylindrical rod 70 in a counterclockwise position (as viewed in FIG. 9) with the result that the latching finger 236 is pivoted upwardly as its forward tapered surface 244 rides along the engaging actuating stud 220 until its forward tip clears the stud 220 whereupon the latching finger 236 pivots counterclockwise until stopped by lug 242. The body portion 238 of the latching arm 222 approaches a downward vertical position as the elevator platform rises to its elevated heat sealing position. Since the latching finger 236 only lightly contacted the particular engaging stud 220 which holds the switch actuating lever 246 in the switch open position, the switch 216 remains open during the downward swing of latching arm 222.

After the cup-shaped container C has had a cover applied across its open end, the elevator platform 50 lowers towards its starting position which rotates the cylindrical rod 70 clockwise (as viewed in FIG. 9) causing the latching finger 236 (now rigidly held against rotation by stop lug 242) to engage the lower surface of the particular actuating stud 220 held against lever 246 and to push upwardly so that the circular disc 219 is urged clockwise against the spring bias force of spring 232. This upward movement of the contacting actuating stud 220 frees the actuating lever 246 to move outwardly and close microswitch 216. The closing of microswitch 216 energizes the electric motor 210 for film advance drive unit 176, causing the film advance drum unit 174 to be turned one-fifth of a revolution where the next successive switch actuating stud 220 pushes the switch actuator lever 246 inwardly to open switch 216 and thereby deenergize electric motor 210. This feed advancing operation is repeated at the end of each automatic cycle of the capping machine 20.

It is to be understood, that the film feed arcuate segments 128 are illustrated in the preferred embodiment as having five individual segments. Depending on the particular design of the machine 20, more or less than five arcuate segments 198 could be employed to perform the same function. Of course, it is necessary that the switch actuating studs 220 on the circular disc 217 have the same number as the arcuate segments 198 so that the film advancing drum unit 174 will be moved one segment per cycle.

It will be recalled that the last operation in the automatic cycle of the capping machine 20 is the advancing the film advance drum unit 174 one-fifth of a revolution counter-clockwise to bring the end of the film strip F directly beneath and across the sealing head unit 44. It is, of course, necessary to cut the end of the film held across the uppermost film feeding arcuate segment 198 prior to the upper edge of container C lifting the strip and bringing it into contact with the sealing head unit 44. For this purpose, a film strip cutting assembly 250 is provided which is actuated by the elevator assembly 20 as it raises the elevator platform 50. The cutting operation is performed by a heated resistance wire 252 carried by a U-shaped frame 254 pivotally mounted to the upper blocks 256 and 258, respectively, on mounting post 26 and 30 (see FIG. 4). As shown in FIG. 8, the U-shaped frame 254 carrying the heated resisted wire 252 is constantly urged to pivot downwardly into the cutting position by a spring 260, which extends between the U-shaped frame 254 and the cross bar 196.

Referring to FIG. 6, it can be seen that the film strip cutting assembly 250 is held in the non-cutting position with the U-shaped frame 254 pivoted upwardly whenever the elevator unit 46 is in the lowered position due to the engaging action of elevator platform 50 with linkage unit 260. The linkage unit 260 consists of an elongated lever 262 pivotally connected between U-shaped frame 254 and short link 264 whose middle portion is pivotally supported on a vertical post 268.

The U-shaped frame 254 is held in the upper non-cutting position of FIG. 1 as long as elevator platform 50 is in the lowered starting position. Due to the constant force applied by spring 260 (FIG. 8) on U-shaped frame 254, linkage 264 constantly urges set screw 270 against platform 50. Consequently, as the elevator platform 50 starts to rise the linkage 264 pivots clockwise and U-shaped frame 254 pivots through corresponding angle in a counterclockwise direction to lower the heated resistance wire 252 into contact with the portion of plastic film stretched across the elongated slot 274 between adjoining arcuate segments 198 to provide a square of heat shrinkable plastic film on the upper most arcuate segment 198. The lower end of linkage 262 contacts base plate 40 to establish the lowermost position of U-shaped frame 254. The film strip cutting assembly 250 remains in the lowered position of FIG. 6 until the elevator platform descends to its starting position.

To catch any drippings spilled from the cup-shaped container C, a splash guard 280 (see FIGS. 1 and 6) is provided and consists of a circular plate 282 mounted in front of circular plate 194 of film advance drum unit 174 and an upwardly curved plate 284 which is secured to the lower outer edge of circular plate 282 and fits inside the circular arrangement of arcuate segments 198. The forward edge of the lower curved plate 284 is supported on the base plate 40 by means of legs 286, 288.

The heat sealing assembly 300 for shrinking a length of heat-shrinkable plastic film F across the mouth of a liquid container C is mounted at the top of the capping machine 20 by means of two parallel support bars 302, 304 which are mounted, respectively, on the top portion of the pairs of mounting rods 26, 30 and 28, 32 (FIG. 3). Two mounting bars 306, 308 (FIG. 1) which extend inwardly from and are secured to the support bars 302, 304, respectively, as by welding, are used to mount sealing head unit 44. To thermally insulate the sealing head unit 44, which is maintained at a relatively hot temperature, from the rest of the capping machine 20, the sealing head unit 44 is mounted on the mounting bars 306, 308 by means of two pairs of pins 310, and 312 (FIG. 14) which are seated in a corresponding pair of apertures in the respective mounting bars 306, 308.

Referring to FIGS. 3 and 14 through 17, it can be seen that the sealing head unit 44 is constructed on a rectangular-shaped mounting plate 314 having a circular opening 316 in its middle portion. Extending downwardly from the upper flat surface of rectangular mounting plate 314 are a plurality of triangular shaped ribs 318 arranged in an equal spaced relationship around the opening 316 to define a plurality of elongated radial slots 320, in which are slidingly received a plurality of sealing head fingers 322. The sealing head fingers 322 are held slidingly in the elongated slot 320 by a circular cam disc 324. The cam disc 324 has a plurality of cam slots 326 equal in number to the heated fingers 322 and into which a stud 328 extending from the mid section of one of the fingers 322 projects. The cam disc 324, which is rotatably mounted to the mounting plate 314 by four radially spaced roller members 330, upon being rotated in a counterclockwise direction (as viewed in FIG. 14) causes the sealing head fingers 322 to move radially inwardly through the cooperating action between the studs 328 and the cam slots 326. The fingers 322 are normally held radially inwardly in the position of FIG. 14 by a spring 331 stretched between rise 333 on cam disc 324 and a stud 335 on the side of mounting plate 314 to constantly urge cam disc 324 clockwise.

The plurality of fingers 322 are heated to a desired temperature by means of a ring heater element 332 (FIGS. 3 and 17) mounted on the top surface of rectangular mounting plate 314 about the central opening 316 with the result that the thermal conduction through mounting plate 312 conducts heat to the sealing head fingers 322. As can be clearly seen in FIG. 17, the heated fingers 322 hold the square of plastic film F against the cup-shaped container C just below its upper open edge for a sufficient period to shrink the square of film F snugly about the container sidewall so that a liquid seal is formed about the upper edge. Each finger 322 has an enlarged head 334 to provide a more than adequate contact area to effect shrinking.

The sealing head assembly 44 also includes a thermosetting plastic disc 338 which has a diameter slightly less than the circular opening 316 and is mounted in the opening 316. As best shown in FIGS. 3, 15 and 17, the plastic thermosetting disc 38 and its associated mounting stem 340, extending upwardly from its center portion are slidingly mounted in an opening 342 formed in the center of a horizontal mounting bar 344, which rest on diagonally opposite portions of ring heater 332 and is secured at its outer end to the mounting plate 314. To insulate the thermosetting disc 338 from the ring heater 332, the outer cylindrical shell 348 of stem 340 is made of a thermally insulated material. Inside the cylindrical shell 348 is a heat conductive metal slug 350 which transmits heat to the thermosetting disc 338 from a cal-rod 352 received in a cylindrical-shaped cavity formed axially in the upper end of the cylindrical slug 350. A stop ring 354 fastened about the upper end of the mounting stem 340 rests on a circular bearing 356 at the top of opening 342 to limit the downward position of the thermosetting disc 338. The disc 338 is mounted to the stem 340 by means of a screw 358.

As depicted in FIG. 17 the upper edge of cup-shaped container C in the elevated heat sealing position engages the thermosetting disc 338 with the square strip of film F sandwiched therebetween, and the heated disc causes the film to shrink biaxially to form a taut surface across the mouth of container C. FIG. 17 shows the spatial relationship between the thermosetting disc 338 and the plurality of fingers 322 in order that the fingers 322 will engage about the sidewall of the container C just below its upper edge. A needle 360 extends downwardly from the disc 338 to puncture a small breathing hole in the film F, for the purpose of releasing hot air from the cup when the container C is filled with a hot liquid. Were is not for the needle 360, the pressure formed by the hot air would cause the film cover to balloon and pop off the container C.

The temperature of the thermosetting disc 338 and the plurality of heated fingers 322, which are thermally insulated from each other, are maintained at their respective desired temperatures by means of thermostats 362 and 364 (FIG. 3), respectively, which are mounted on thermosetting disc 338 and rectangular mounting plate 314, respectively.

The reason that the thermosetting disc 338 is slidingly mounted in the opening 342 of mounting bar 344 is that it also serves as the actuating means for simultaneously stopping the elevator unit 46 and actuating the closing of the heated fingers 322. As depicted in FIG. 15, when the liquid container C is raised by the elevator platform 50, to the elevated position where its upper edge contacts thermosetting disc 338, container C lifts disc 338 upwardly a short distance to raise pivotally mounted switch actuated lever 364 until it actuates microswitch 366. The switch actuating lever 364 is pivotally mounted at 368 (FIG. 1) to the mounting bar 344. An adjustable screw member 370 (FIG. 15) interconnects the actuating lever 364 to the thermosetting disc 338 and is adjusted so that a slight upward deflection of thermosetting disc 338 will actuate microswitch 366.

When the microswitch 366 is actuated by the contact of the liquid container C with the thermosetting disc 338, the following operations take place: the electric motor 64 for the elevator drive mechanism 60 is deenergized halting the rise of the elevator platform 50; the sealing head solenoid 380 (FIG. 3) is energized to bring the heated fingers 322 into engagement with the sidewall of liquid container C; and an electrical timer device 382 is energized, which times the preselected heating period for forming the liquid seal about the container C.

The timing device 382 could be any of the commercially available second timers and functions to measure the heat period necessary to apply a suitable amount of shrinking of the film F to provide an adequate liquid seal about the mouth of the container C. At the end of the pre-selected timing period, about 1.5 seconds, the electrical timing device 382 simultaneously deenergizes the sealing head solenoid 382 for the withdrawal of sealing head fingers 322 and deenergizes the clutch solenoid 90 to permit the elevator platform to lower to the starting position.

When the heat sealing solenoid 380 (FIG. 3) is energized, its plunger 381 is pulled inwardly to rotate cam disc 324 counterclockwise (as viewed in FIGS. 14 and 16). The counterclockwise rotation of cam disc 324 causes the head sealing fingers 322 to move radially inwardly as their respective studs 328 are forced inwardly along cam slots 326.

To permit the sealing head unit 44 to accommodate all containers C having different size diameters at its upper open end, a lost motion connection is provided between disc 324 and solenoid plunger 381 by spring 385 (FIG. 14) having its opposite ends fastened to the outer end of plunger 381 and lug 387 on cam disc 324. By virtue of this spring connection, the sealing head fingers 322 stop upon engaging about the upper end of container C, and for the remainder of plunger 381's movement the spring 385 is stretched.

The electrical wiring diagram for the capping machine 20 of this invention is schematically illustrated in FIG. 19. Power to the capping machine 20 is supplied from a conventional 115 volt A-C volt line by plugging the ends of supply lines 401, 402 into any household outlet. A low voltage is applied across heated resistance wire 252 of film strip cutting assembly 250 from transformer 404, which is mounted on the rear of base plate 40. Ring heater 332 and cal-rod 352 are connected in parallel across the supply lines 401, 402 and in series with, respectively, electrical thermostats 364 and 362.

When the starting microswitch 110 is actuated by the contact with the sidewall of the cup-shaped liquid container C as it is inserted on the elevator platform 50, coil 406 of a double-acting, lock-in relay 408 is energized to complete the circuit across the normally open electrical contacts 410, 412 of lock-in relay 408, with the result that a current path is completed to clutch solenoid coil 414 of clutch solenoid 90 and to electric motor 64 of elevator unit 46. The energization of the electric motor 64 raises the elevator platform through the elevator drive mechanism 60 until the upper edge of the container C engages the thermosetting disc 338 and raises it a short distance to actuate microswitch 366.

The energization of microswitch 366 moves the electrical contact arm 416 from the solid line position of FIG. 19 to the dotted line position with the result that the electric motor 64 is deenergized to stop the rise of the elevator platform 50. However, since the clutch solenoid 90 remains energized, the elevator unit 46 is held in the elevated heat sealing position.

The movement of the switch contact arm 416 of the microswitch 366 to the dotted line position of FIG. 19, simultaneously energizes the heated finger solenoid 380 and the electric timer device 382. The energization of the solenoid 380 causes the movement of the heated fingers 322 to move radially inwardly and contact the container C in the manner previously described.

The electric timer motor 420 of the electric timing device 382 remains energized and drives a cam 422 counterclockwise until the rise 424 on the cam 422 moves an actuating arm 426 causing the displacement of electrical contact 428 from the solid line position of FIG. 19 to the dotted line position. The movement of electrical contact 428 from the solid line position of FIG. 19 to the dotted line position simultaneously deenergizes heated finger solenoid 380 and energizes coil 430 of lock-in relay 408. The deenergization of solenoid 380 permits the heat sealing fingers to move radially outwardly under the biasing force of spring 331. The energization of coil 430 opens the circuit across contacts 410, 412 to deenergize clutch solenoid coil 14 of clutch solenoid 90 to free the elevator unit 46 to lower itself to the starting position.

When the elevator platform 50 approaches its starting position, the switch latch arm 222 (FIG. 9) of switch tripping device 218 is swung upwardly by cylindrical rod 70 urging the switch actuating stud 220 upwardly to free switch actuating lever 246 to close the contact 430 of microswitch 216 which closes the current path to motor 210 of film advance drive unit 176. The film advance drive unit 176 rotates the film advance drum unit 174 one-fifth of a revolution, at which time the next succeeding actuating stud 220 contacts the actuating lever 246 to open contact 430 of microswitch 216 with the result that the electric motor 210 is deenergized and the film advance drive assembly stops.

The fully automatic operation of the capping machine 20 will become apparent with the following description of its sequence of operations. A liquid container C when placed on the elevator platform 50 and pushed back into the jaws 110, 112 and 114 of the centering device 48 contacts microswitch 110 to energize the elevator assembly 42. As the elevator unit 46 starts to rise, the film strip cutting assembly 250 is lowered and the heated resistant wire 252 severs the plastic film F, leaving a square strip of plastic film F held across the uppermost film feeding arcuate segments 198, which has been brought into position by the film advance assembly 170 at the end of the previous automatic cycle.

As the platform raises, the container C is moved into a center position relative to the sealing head unit 44 by the centering device 48 located on the platform 50.

Figure 2:
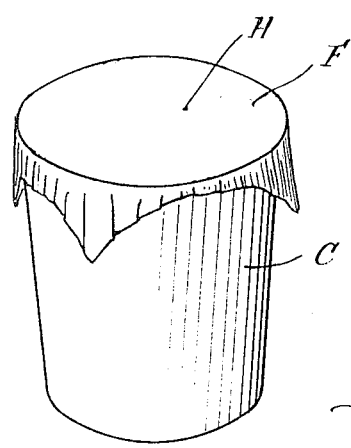
FIG. 2 illustrates a cup-shaped container having a heat shrinkable plastic film length applied across its upper open end to form a liquid-tight seal thereon in accordance with the principles of this invention.

The elevator unit 46 continues to rise, and as the upper edge of the container C passes through the opening 204 in the uppermost arcuate segment 198, the square strip of film F stretched across this opening is pulled off its four spaced spikes 206 and drapes across the open mouth of the container C, in a fashion illustrated in FIG. 2. The upper edge of the container C with the film F draped over its open end then engages the thermosetting heated disc 338 and raises the disc 338 a very short distance to actuate microswitch 366. The clutch device 74 holds the elevator platform 50 in this elevated capping position during the heat sealing period.

Simultaneously with the stopping of the elevator unit 46, the sealing head solenoid 380 is energized to cause the plurality of sealing head fingers 322 to move radially inwardly to engage the side of the cup-shaped container immediately below its upper lip portion. The fingers 322 hold the film against the sidewall of container C for a preselected time period of sufficient length to permit the film to shrink tightly about the mouth of the container and form a liquid-tight seal.

At the termination of the timing period, the cam 422 of timing motor 420 switches the position of electrical contact 420 to simultaneously deenergize the sealing head solenoid 380 withdrawing the sealing head fingers away from the container C and to deenergize the clutch solenoid 90 to allow the elevator unit 46 to lower to the starting position.

As the elevator platform 50 nears the bottom position, its lower surface engages the linkage unit 260 which pivots the U-shaped frame 254 of the film strip cutting assembly 250 upwardly away from the film advance drum unit 174 into its noncutting stored position.

Upon the platform 50 reaching the starting position, the switch tripping device 218 is actuated by the switch latch arm 222 carried by the cylindrical rod 70 to energize the film advance drive unit 176 and rotate the film advance drum unit 174 one-fifth of a revolution such that the end of the strip of plastic film F is fed directly beneath and below the sealing head unit 44.

From the foregoing description of the liquid-container capping machine 20, it can be seen that the preferred embodiment of this invention is designed to automatically apply a liquid-tight cover of heat shrinkable plastic film to a variety of types and sizes of cup-shaped containers. The height of the containers C may vary over a considerable range due to the fact that the elevated stopping position of platform 50 is controlled by the slight movement of the thermosetting disc 330 upon impact with the upper edge of the container C to actuate switch 366. To adapt machine 20 to containers C having different diameters at the lower and upper ends of the container C, the centering device 48 on the elevator platform 50 and the sealing head unit 44 for sealing head finger 322 both have a lost-motion feature included in their mechanism to accommodate a large range of diameters at the lower and upper ends, respectively, of a cup-shaped container.

From experiments, it has been learned that a capping machine constructed in accordance with this invention will apply a liquid-tight cover to almost any type of cup-shaped container. It has been found to be particularly effective with plastic-coated paper cups, wax coated paper cups, vacuum-formed plastic cups, injection-molded plastic cups, and plastic-foam cups. Although the sealing head unit 44 is designed so that the sealing head fingers will engage the container below its downturn lip around the upper edge of the container, the capping machine 20 applies an equally effective liquid-seal to all cups not having such a lip portion.

It will be appreciated that the preferred embodiment was constructed to specifically cover a cup-shaped liquid container, and that the principles of this invention would apply as well to design a capping machine for applying a cover to any regular shaped liquid container.

I claim:

1. An apparatus for sealing a heat shrinkable plastic film across the upper open end of a container comprising a sealing head unit supported in an elevated position, means for feeding the end of a roll of heat shrinkable plastic film across and below said sealing head unit, said feeding means including a film feeding plate with an enlarged opening for carrying the end of the plastic film roll, means for cutting from the plastic film roll the strip of plastic film carried by said plate to a length large enough to cover the open upper end of the container, means for raising an elevator platform adapted to carry the container towards said sealing head unit where the upper edge of the container passes through said enlarged opening in said plate to catch and carry the cut length of plastic film into engagement with said sealing head unit, means for holding said elevator platform in the elevated heat sealing position, means for heating said sealing head unit to cause said cut length of plastic film to shrink biaxially forming a liquid-tight seal cover about the upper edge of the container, and means for lowering said elevator platform upon completion of the sealing operation, where said sealing head unit includes an actuator member disposed to be engaged by the upper edge of the container and a circular arrangement of radially adjustable sealing head fingers slidably mounted a short distance below said actuator member, cam disc means for alternately moving said sealing fingers radially inwardly and outwardly, means for heating said fingers, power means for rotating said cam disc in a direction to move said fingers radially inwardly to engage the upper sidewall portion of the container, and actuating means triggered by the engagement of the upper edge of the container against said actuator member for energizing said power means.

2. The apparatus of claim 1, wherein the connection between said cam disc means and said power means includes a lost motion means to permit said cam disc means to stop upon said fingers engaging the upper sidewall portion of the container and to allow said power means to move from a first to a second position upon each energization regardless of the size of the upper edge of the container.

3. The apparatus of claim 1, further comprising a centering device carried by said elevator platform which repositions said container to be directly in vertical alignment with the center of said circular arrangement of radially adjustable fingers and means for operating said centering device.

4. The apparatus of claim 3, wherein said centering device includes a plurality of slidably mounted jaw members on said elevator platform which move in radial paths towards and away from the center line of said circular arrangement of radially adjustable sealing head fingers, a second cam disc means for simultaneously moving said jaw members along their respective radial paths, and wherein said means for operating said centering device includes a vertical member having a cam track, a cam follower arm slidably mounted on said elevator platform with a cam adapted to ride in said cam track, and a linkage means for connecting said cam follower arm and said second cam disc means such that said jaws are moved radially inwardly as said elevator platform rises.

5. The apparatus of claim 4, wherein said linkage means includes a lost-motion means to permit said second disc means to stop upon said jaw members engaging the lower sidewall portion of the container and to allow said cam follower to continue to slide as said cam rides along said cam track with the raising of said elevator platform.

6. An apparatus for sealing a heat shrinkable plastic film across the upper open end of a container comprising a sealing head unit supported in an elevated position, means for feeding the end of a roll of heat shrinkable plastic film across and below said sealing head unit, said feeding means including a film feeding plate with an enlarged opening for carrying the end of the plastic film roll, means for cutting from the plastic film roll the strip of plastic film carried by said plate to a length large enough to cover the upper end of the container, means for raising an elevator platform adapted to carry the container towards said sealing head unit where the upper edge of the container passes through said enlarged opening in said plate to catch and carry the cut length of plastic film into engagement with said sealing head unit, means for holding said elevator platform in the elevated heat sealing position, means for heating said sealing head unit to cause said cut length of plastic film to shrink biaxially forming a liquid-tight seal cover about the upper edge of the container, and means for lowering said elevator platform upon completion of the sealing operation, where said means for feeding the end of a roll of heat shrinkable plastic film comprises a film advance drum unit having a rotatably mounted circular plate with a plurality of other film feeding plates which with said film feeding plate extend from said circular plate in an equal spaced relationship, all of said film feeding plates having spikes for holding a strip of plastic film thereon, a film advance drive unit for rotating said film advance drum unit through an arcuate distance sufficient to bring the next successive film feed plate to a position directly below said sealing head unit, and actuating means for energizing said film advance drive unit as said elevator platform lowers to its starting position and for deenergizing said film advance drive unit after said next successive film feed plate is positioned directly below said sealing head unit.

7. An apparatus for sealing a heat shrinkable plastic film across the upper open end of a container comprising a sealing head unit supported in an elevated position, means for feeding the end of a roll of heat shrinkable plastic film across and below said sealing head unit, said feeding means including a film feeding plate with an enlarged opening for carrying the end of the plastic film roll, means for cutting from the plastic film roll the strip of plastic film carried by said plate to a length large enough to cover the open upper end of the container, means for raising an elevator platform adapted to carry the container towards said sealing head unit where the upper edge of the container passes through said enlarged opening in said plate to catch and carry the cut length of plastic film into engagement with said sealing head unit, means for holding said elevator platform in the elevated heat sealing position, means for heating said sealing head unit to cause said cut length of plastic film to shrink biaxially forming a liquid-tight seal cover about the upper edge of the container, and means for lowering said elevator platform upon completion of the sealing operation, where said means for raising said elevator platform includes a vertical frame member for supporting and carrying said platform vertically along vertical mounting post and a first power means for raising said platform, and further comprising first actuator means carried by said elevator platform which is contacted by the sidewall of the container when placed on said elevator platform to energize said first power means for raising said elevator platform and a second actuator means mounted in the center of said sealing head unit which when contacted by the upper edge of the container deenergizes said first power means, and where said means for lowering said elevator platform comprises a timer means which is started by said second actuator means and which after a pre-selected heating period releases said means for holding said platform in an elevated heat sealing position to permit said elevator platform to lower.

8. The apparatus of claim 7, wherein said sealing head unit includes a circular arrangement of radially adjustable sealing head fingers slidably mounted a short distance below said second actuator means, cam disc means for alternately moving said sealing head fingers radially inwardly and outwardly, means for heating said sealing head fingers, a second power means for rotating said cam disc in one direction to move said fingers radially inwardly to engage about the upper sidewall portion of the container, and a spring bias means for constantly urging said cam disc to turn in the opposite direction to hold said fingers in a radial outward position where the actuation of said second actuator means energizes said second power means to move said fingers radially inwardly, and where said timer means at the end of said pre-selected heating period deenergizes said second power means to permit said sealing head fingers to move inwardly under the influence of said spring bias means.

9. The apparatus of claim 7, wherein said means for feeding the end of a roll of heat shrinkable plastic film comprises a film advance drum unit having a rotatably mounted circular plate with a plurality of other film feeding plates which with said film feeding plate extend from said circular plate in an equal spaced relationship, each of said film feeding plates having means for holding a strip of plastic film thereon, a film advance drive unit for rotating said film advance drum unit through an arcuate distance sufficient to bring the next successive film feed plate to a position directly below said sealing head unit, and a third actuating means for energizing said film feed drive unit as said elevator unit lowers to its starting position and to deenergize said film advance drive unit as the next successive film feed plate is positioned directly below said sealing head unit.

10. An apparatus for sealing a heat shrinkable plastic film across the upper end of a container comprising a sealing head unit supported in an elevated position, a film feeding plate having an enlarged opening disposed below said sealing head unit a short distance and having means for holding a cut length of heat shrinkable plastic film across said enlarged opening, means for raising an elevator platform adapted to carry a container towards said sealing head unit where the upper edge of the container passes through said enlarged opening in said film feeding plate to catch and carry the cut length of plastic film into engagement with said sealing head unit, means for holding said elevator platform in the elevated heat sealing position, means for heating said sealing head unit to cause the cut length of plastic film to shrink biaxially forming a sealed cover about the upper edge of the container, and means for lowering said elevator platform upon completion of the sealing operation, where said heating means includes a heat conducting plate having larger cross-sectional size than the upper open end of said container and disposed to be engaged by the upper edge of said container in said elevated heat sealing position and heat transmitting means for heating said heat conductive plate.

11. An apparatus for sealing a heat shrinkable plastic film across the upper end of a container comprising a sealing head unit supported in an elevated position, a film feeding plate having an enlarged opening disposed below said sealing head unit a short distance and having means for holding a cut length of heat shrinkable plastic film across said enlarged opening, means for raising an elevator platform adapted to carry a container towards said sealing head unit where the upper edge of the container passes through said enlarged opening in said film feeding plate to catch and carry the cut length of plastic film into engagement with said sealing head unit, means for holding said elevator platform in the elevated heat sealing position, means for heating said sealing head unit to cause the cut length of plastic film to shrink biaxially forming a sealed cover about the upper edge of the container, and means for lowering said elevator platform upon completion of the sealing operation, where said sealing head unit includes a horizontal plate disposed to be engaged by the upper edge of the liquid container and a circular arrangement of radially adjustable sealing head fingers slidably mounted a short distance below said horizontal plate, cam disc means for alternately moving said sealing head fingers radially inwardly and outwardly, power means for rotating said cam disc in a direction to move said fingers radially inwardly to engage the upper sidewall portion of the container, and actuating means triggered by the engagement of the upper edge of the container against said horizontal plate for energizing said power means, and where said means for heating said sealing head unit conducts heat to said sealing head fingers and said horizontal plate.

12. The apparatus of claim 11, wherein the connection between said cam disc means and said power means includes a lost motion means to permit said cam disc means to stop upon said sealing head fingers engaging the upper sidewall portion of the container and to allow said power means to move between a first and second position regardless of the size of the upper edge of the container.

13. The apparatus of claim 11, further comprising a centering device carried by said elevator platform which repositions said container to be directly in vertical alignment with the center of said circular arrangement of radially adjustable head sealing fingers and means for operating said centering device.

14. The apparatus of claim 13 wherein said centering device includes a plurality of slidably mounted jaw members on said elevator platform which move in radial paths towards and away from the center line of said circular arrangement of said radially adjustable head sealing fingers, a second cam disc means for simultaneously moving said jaw members along their respective radial paths, and wherein said means for operating said centering device includes a vertical member having a cam track, a cam follower arm slidably mounted on said elevator platform having a cam adapted to ride in said cam track, and a linkage means for connecting said cam follower arm and said second cam disc means such that said jaws are moved radially inwardly as said elevator platform rises.

15. The apparatus of claim 14, wherein said linkage means includes a lost motion means to permit said second disc means to stop upon said jaw members engaging the lower sidewall portion of the container and to allow said cam follower to continue to slide as said cam rides along said cam track with the raising of said elevator platform.

16. An apparatus for sealing a heat shrinkable plastic film across the upper end of a container comprising a sealing head unit supported in an elevated position, a film feeding plate having an enlarged opening disposed below said sealing head unit a short distance and having means for holding a cut length of heat shrinkable plastic film across said enlarged opening, means for raising an elevator platform adapted to carry a container towards said sealing head unit where the upper edge of the container passes through said enlarged opening in said film feeding plate to catch and carry the cut length of plastic film into engagement with said sealing head unit, means for holding said elevator platform in the elevated heat sealing position, means for heating said sealing head unit to cause the cut length of plastic film to shrink biaxially forming a sealed cover about the upper edge of the container, and means for lowering said elevator platform upon completion of the sealing operation, where said means for raising said elevator platform includes a vertical frame member for supporting and carrying said elevator platform along a pair of spaced vertical mounting posts and a first power means for raising said elevator platform, and further comprising a first actuator means carried by said platform which is contacted by the sidewall of the container when placed on the platform to energize said first power means for raising said elevator platform and a second actuator means mounted in the center of said sealing head unit which is contacted by the upper edge of the container to deenergize said first power means stopping the upward movement of said elevator platform and where said means for lowering said elevator platform comprises a timer means which is started by said second actuator means and which after a pre-selected heating period releases said means for holding said elevator platform in the elevated heat sealing position and permit the elevator to lower.

17. The apparatus of claim 16, wherein said sealing head unit includes a circular arrangement of radially adjustable sealing head fingers slidably mounted a short distance below said second actuator means, can disc means for alternately moving said head sealing fingers radially inwardly and outwardly, means for conducting heat to said sealing head fingers from said heating means, a second power means for rotating said cam disc in one direction to move said fingers radially inwardly to engage the upper sidewall portion of the container, and a spring bias means for urging said cam disc to turn in the opposite direction, where the actuation of said second actuator means energizes said second power means and where said timer means at the end of said pre-selected heating period deenergizes said second power means to permit said sealing head fingers to move inwardly under the influence of said spring bias means.

18. The apparatus of claim 16, further including a means for feeding the end of a roll of heat shrinkable plastic film comprising a film advance drum unit having a rotatably mounted circular plate with a plurality of other film feeding plates which with said film feeding plate extend from said circular plate in an equal spaced relationship, all of said film feeding plates having means for holding a strip of plastic film thereon, a film advance drive unit for rotating said film advance drum unit through an arcuate distance sufficient to bring the next successive film feed plate to a position directly below said sealing head unit, and a third actuating means for energizing said film feed drive unit as said elevator unit lowers to its starting position and for deenergizing said film drive unit upon the next successive film feed plate being positioned directly below said sealing head unit.

19. An apparatus for sealing a heat shrinkable plastic film across the upper end of a container comprising a pair of front and rear mounting posts supported on a horizontal base, a heat sealing assembly including sealing head unit supported between said vertical mounting posts at their upper ends, a film advance drum unit comprising a circular vertical plate rotatably mounted by a horizontal cross bar mounted at the middle portion of the rearward pair of said mounting posts and a plurality of film feeding plates extending forwardly from the outer periphery of said circular plate in equal spaced relationship, each of said film feeding plates having an enlarged opening and spike means for holding a strip of plastic film across said enlarged opening, a film advance drive unit for rotating said film advance drum unit a sufficient distance to move the next successive film feed plate to a position directly below said sealing head unit, a film supply unit for supplying film to said film advance drum unit comprising a film roll tubular holder mounted between one of said front mounting posts and one of said rear mounting posts at their top portion and a roller means for feeding a strip of plastic film from the film roll tangentially on each of said film feeding plates, means for cutting the strip of film carried by the uppermost film feeding plate, an elevator assembly comprising a vertical frame member slidably mounted on said forward pair of vertical mounting post, an elevator platform adapted to carry a container carried by and extending rearwardly from said vertical frame member, means for raising said elevator platform towards said sealing head unit where the upper edge of the container passes through said enlarged opening in the uppermost of said film feeding plates to catch and carry the cut length of plastic film into engagement with said sealing head unit and means for holding said elevator platform in an elevated heat sealing position, said heat sealing assembly including means for heating said sealing head unit to cause said cut length of plastic film to shrink biaxially forming a liquid sealed cover about the upper edge of the container, and means for lowering said elevator platform upon completion of the sealing operation.

20. The apparatus of claim 19, wherein said head sealing unit includes a horizontal mounting plate with a central opening and a plurality of equally spaced ribs extending downwardly from the plate surface and radially around said central opening, a plurality of head sealing fingers slidingly received between said ribs, a cam disc having a plurality of cam slots equal in number to the number of said head sealing fingers and rotatably mounted to the lower surface of said mounting plate to contain said head sealing fingers between said ribs, each of said head sealing fingers having a stud projecting into one of said cam slots, spring means for biasing said cam disc in one direction to hold said fingers in their radial inward position, and wherein said heat sealing assembly includes two parallel mounting bars fastened at the top portion of opposite pairs of said vertical mounting posts, means for supporting said mounting plate of said head sealing unit to said parallel mounting bars in a thermal insulating manner, means for heating said head sealing fingers, and power means for rotating said cam disc in the other direction to move said head sealing finger radially inward to engage the sidewall of a container about its upper end.

21. The apparatus of claim 20, wherein said power means is a solenoid which moves a plunger from a first position to a second position when energized and said plunger is interconnected to said cam disc by a spring to permit said head sealing fingers to stop upon engaging the sidewall of the container while said plunger moves from said first position to said second position upon the energization of said solenoid.

22. The apparatus of claim 19, wherein said means for cutting the strip of film comprises a resistance wire mounted across the arm portions of a U-shaped frame which is pivotally mounted between one of said front mounting post and one of said rear mounting post such that said resistance wire can be swung to a lower cutting position between the uppermost of said film feeding plates and said successive film feed plate, spring means for urging said U-shaped frame downward, and linkage means interconnecting said U-shaped frame and said elevator assembly to hold said U-shaped frame upwardly when said elevator platform is in its lowered starting position.

23. The apparatus of claim 20 wherein said elevator assembly includes a centering device carried by said elevator platform which repositions said container to be directly in vertical alignment with the center of said circular arrangement of said head sealing fingers, and means for operating said centering device in response to the vertical movement of said elevator platform.

24. The apparatus of claim 23, wherein said centering device includes a plurality of slidably mounted jaw members on said elevator platform which move in radial paths towards and away from a vertical center line of said circular arrangement of said head sealing fingers, a second cam disc means for simultaneously moving said jaw members along their respective radial paths, and wherein said means for operating said centering device includes a vertical member supported by said horizontal base and having a cam rack, a cam follower arm slidably mounted on said elevator platform and having a cam adapted to ride in said cam track, and a linkage means for connecting said cam follower arm and said second cam disc means such that said jaws are moved radially inwardly as said elevator platform rises.

25. The apparatus of claim 24 wherein said linkage means includes a lost motion means to permit said second disc means to stop upon said jaw members engaging the lower sidewall portion of the container and to allow said cam follower to continue to slide as its cam rides along said cam track with the raising of said elevator platform.

26. The apparatus of claim 19, wherein said elevator assembly includes a rod member rotatably mounted at its opposite ends by two bars extending rearwardly from said rear pair of vertical mounting posts, two linkage units extending between said opposite ends of said rod member and the opposite ends of said vertical frame member, each of said linkage units including a least two pivotally connected links, one of said links being rigidly fastened to said rod member and the other of said links being pivotally connected to said vertical frame member and being pivotally supported between its ends by one of said rear vertical posts, and wherein said means for raising said elevator platform comprises a power means for turning said rod member such that said one link on each linkage unit turns causing the corresponding said other link of each linkage unit to pivot and raise said vertical frame member and associated elevator platform upwardly.

27. The apparatus of claim 26, wherein said power means comprises an electric motor on said horizontal base having a chain drive sprocket coupled to its output shaft, a lever disposed above said electric motor having one end rigidly fastened to said rod member and a length of chain wrapped around said chain sprocket having one end connected to the other end of said lever and having the other end interconnected to said one end of said lever by means of a spring.

28. The apparatus of claim 27, wherein said means for holding said elevator platform in an elevated heat sealing position comprises a clutch means for locking said chain drive sprocket in position and a solenoid means for moving said clutch means into a locking engagement with said chain drive sprocket.

29. In an apparatus for sealing a heat shrinkable plastic film across the upper open end of a container, a sealing head unit comprising a mounting plate with a central opening and a plurality of equally spaced ribs extending downwardly from the lower plate surface and radially around said central opening, a plurality of head sealing fingers slidingly received in the slots defined by said ribs, a cam disc having a plurality of cam slots equal in number to the number of said head sealing fingers and rotatably mounted to said lower plate surface to contain said head sealing fingers in said slots, each of said head sealing fingers having a stud projecting into one of said cam slots, spring means for basing said cam disc in one direction to hold said fingers in their radial inward position, power means for moving said cam disc in the other direction to move said head sealing fingers radially inward to engage the sidewall of a container about its upper end, and means for heating said head sealing fingers to a desired temperature for biaxially shrinking a length of heat shrinkable plastic film draped over the upper open end of the container and held by said head sealing fingers about the upper sidewall portion of the container to form a liquid-tight seal.

30. The combination of claim 29, wherein said sealing head unit further comprises a flat plate surface disposed in the center of said central opening and spaced above said head sealing fingers a distance sufficient to permit said sealing head fingers to engage the sidewall of a container slightly below its upper edge when the upper edge is in an abutting relation with said flat plate surface, and means for heating said flat plate surface to stretch said length of film across the mouth of the container.

31. The combination of clam 30, further comprising a needle projecting downwardly from said flat plate surface to make a hole in the plastic film cover across the mouth of a container for releasing hot air in the event the container is filled with a hot liquid.

32. A tripping device mounted on the shaft of a drum advance unit having the plurality of feed plates in a circular arrangement for energizing an electric motor to sequentially turn the drum advance unit through the same angle upon each actuation to move each plate to the position of the adjacent plate in the direction of rotation comprising a disc rotatably on said shaft having an arcuate slot, a stud carried by said shaft projecting through said arcuate slot, a spring connected between said stud and said disc to urge said disc to rotate about said shaft in one direction until said stud engages the end of said arcuate slot, said disc having a number of actuator studs equal to the number of said feed plates equally spaced around said disc, said actuator studs adapted to engage an electrical switch actuator lever of a switch for energizing said motor and hold the switch contacts in an open position, and an actuating lever adapted to urge said disc to turn in the other direction causing the particular actuator stud engaging said switch actuator lever to become disengaged to thereby close the switch contacts and energize said electric motor, where said drum unit is rotated until the next successive actuating stud engages and moves said switch actuating lever to open said switch contacts.

33. An apparatus for sealing a heat shrinkable plastic film across the upper open end of a container comprising a sealing head unit supported in an elevated position, film advance means for feeding the end of a roll of heat shrinkable plastic film across and below said sealing head unit including a plurality of film feeding plates each having an enlarged opening and pin means disposed about said enlarged openings for holding said film onto said plate, and film advance drive means for sequentially moving one of said plates to a position directly below said sealing head unit for each sealing operation, means for cutting the plastic film roll to a length large enough to cover the upper open end of the container for providing a strip of plastic film carried by the particular film feeding plate that is moved below said sealing head unit, means for raising an elevator platform adapted to carry the container towards said sealing head unit where the upper edge of the container passes through said enlarged opening in said plate positioned below said sealing head unit to catch and carry the cut length of plastic film into engagement with said sealing head unit, means for holding said elevator platform in the elevated head sealing position, means for heating said sealing head unit to cause said cut length of plastic film to shrink biaxially forming a liquid-tight seal cover about the upper edge of the container, and means for lowering said elevator platform upon completion of the sealing operation.

34. The apparatus of claim 33, wherein said heating means includes a heat conducting plate having larger cross-sectional size than the upper open end of said container and disposed to be engaged by the upper edge of said container in said elevated heat sealing position and heat transmitting means for heating said heat conductive plate.

* * * * *